United States Patent [19]

Cushing et al.

[11] 4,161,784
[45] Jul. 17, 1979

[54] MICROPROGRAMMABLE FLOATING POINT ARITHMETIC UNIT CAPABLE OF PERFORMING ARITHMETIC OPERATIONS ON LONG AND SHORT OPERANDS

[75] Inventors: David E. Cushing, Chelmsford; Steven A. Tague, Billerica, both of Mass.

[73] Assignee: Honeywell Information Systems, Inc., Waltham, Mass.

[21] Appl. No.: 867,242

[22] Filed: Jan. 5, 1978

[51] Int. Cl.² ............................ G06F 7/48; G06F 9/00
[52] U.S. Cl. .................................... 364/748; 364/200; 364/749
[58] Field of Search ................ 364/748, 749, 200, 900

[56] References Cited

U.S. PATENT DOCUMENTS

| | | | |
|---|---|---|---|
| 3,234,370 | 2/1966 | Erickson | 364/749 |
| 3,287,703 | 11/1966 | Slotnick | 364/200 |
| 3,725,649 | 4/1973 | Deerfield | 364/748 |
| 3,739,352 | 6/1973 | Packard | 364/200 |

*Primary Examiner*—Jerry Smith
*Attorney, Agent, or Firm*—Faith F. Driscoll; Nicholas Prasinos; Ronald T. Reiling

[57] ABSTRACT

A scientific processing unit includes a microprogrammable arithmetic processing apparatus for performing floating point arithmetic operations with operands in long and short form. The apparatus includes a microprogrammable control section and a plurality of microprocessor arithmetic and logic unit chip stages organized into two sections and carry look-ahead circuits coupled thereto. One section includes a predetermined number of series-coupled stages connected to process exponent values or long mantissa values. The other section includes another predetermined number of series coupled stages connected to process short mantissa values. Control circuits interconnect the stages of both sections and connect to the carry look-ahead circuits and to the microprogrammed control section. During the performance of an arithmetic operation, the control circuits in response to signals from the control section, selectively split the two sections and inhibit the propagation of carries generated by the carry look-ahead circuits for operation of both sections independently and as a single unit as desired for efficient execution of the arithmetic operation.

40 Claims, 9 Drawing Figures

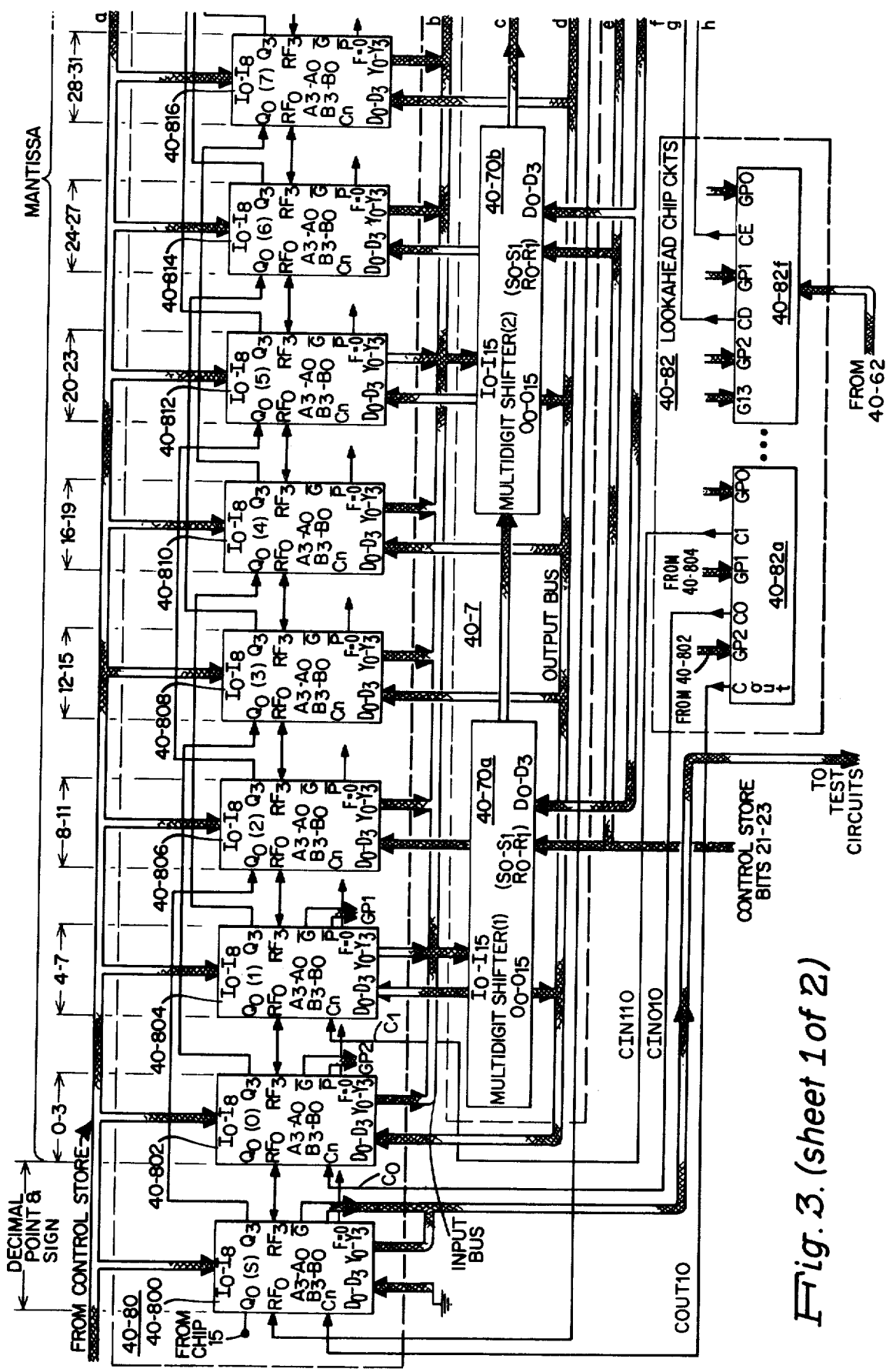
Fig. 3. (sheet 1 of 2)

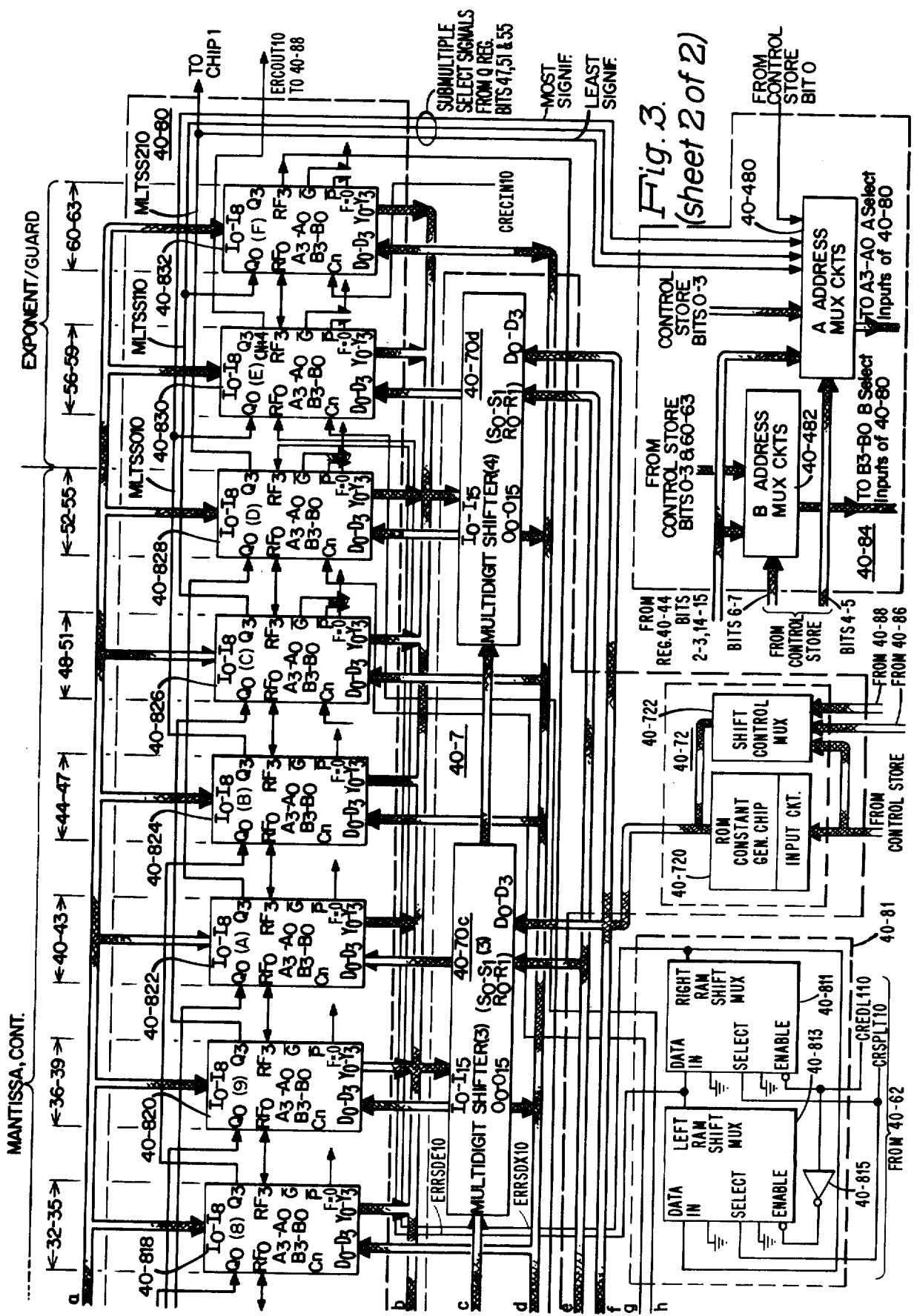
Fig. 3. (Sheet 2 of 2)

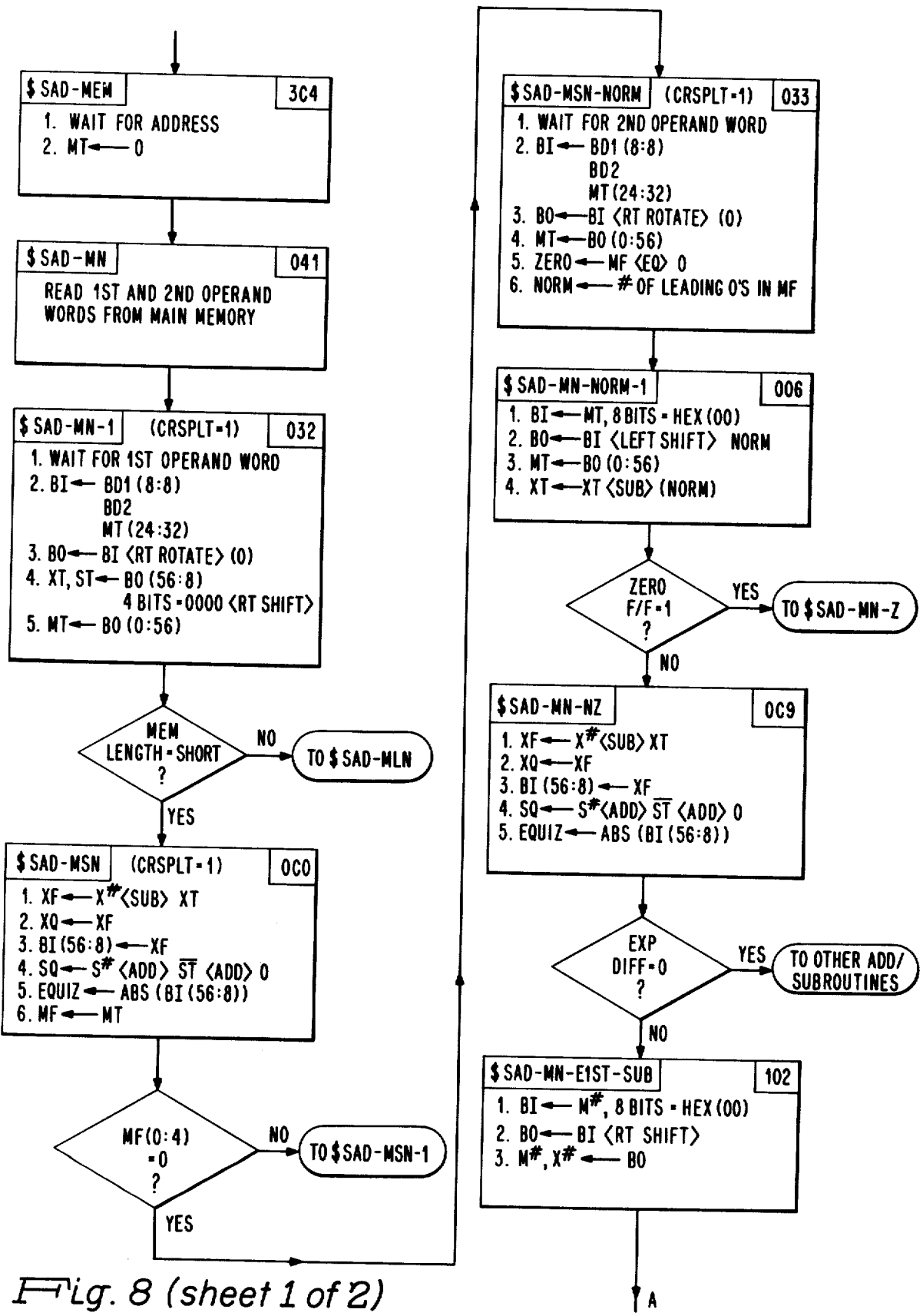
Fig. 8 (sheet 1 of 2)

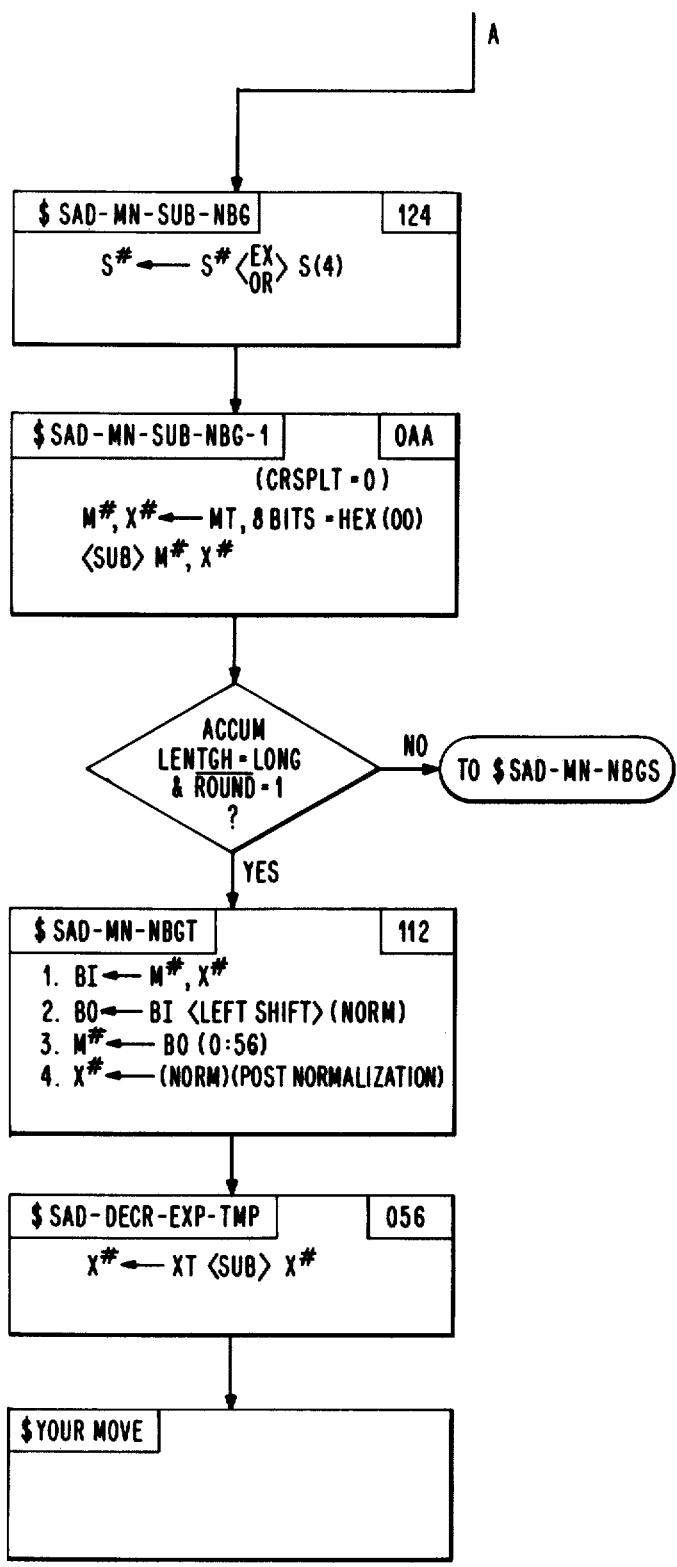
Fig. 8. (sheet 2 of 2)

MICROPROGRAMMABLE FLOATING POINT ARITHMETIC UNIT CAPABLE OF PERFORMING ARITHMETIC OPERATIONS ON LONG AND SHORT OPERANDS

RELATED APPLICATIONS

Copending patent application "Apparatus for Performing Floating Point Arithmetic Operations Using Submultiple Storage" invented by David E. Cushing bearing Ser. No. 815,891 and now U.S. Pat. No. 4,130,879 filed on July 15, 1977 and assigned to the same assignee as named herein.

BACKGROUND OF THE INVENTION

1. Field of Use

The present invention relates to arithmetic processing units and more particularly to arithmetic units which perform floating point operations.

2. Prior Art

In general, an arithmetic processing unit has been designed to afford more flexibility in the types of operations it is required to perform. For example, certain arithmetic processing units are required to process instructions specifying operations involving different operand forms. More specifically, in the case of floating point arithmetic, in certain types of instructions such as those specifying multiply and divide operations, the operands include a short mantissa value (e.g., 56 bit value). For other types of instructions, such as those specifying addition and subtract operations, the operands can include a long mantissa value (i.e., 64 bit value) for certain phases in their execution.

To accommodate the long and short operand requirements of such instructions, data processing units have included separate exponent and mantissa sections wherein the mantissa section is expanded to include a sufficient number of stages for handling the largest size mantissa value required to be processed.

The above arrangement has been found to add considerably to the amount of circuits within the arithmetic processing unit, resulting in increased space and cost.

Accordingly, it is an object of the present invention to provide an arithmetic unit which can handle different types of floating point operands with a minimum amount of additional circuits.

It is a further object of the present invention to provide an arithmetic unit which can process mantissa and exponent values without any degradation in performance.

SUMMARY OF THE INVENTION

The above objects are achieved in a single microprogrammed controlled floating point unit including a microprogrammed control section and a plurality of arithmetic and logic and carry look-ahead circuits. The stages are organized into two arithmetic and logic sections, each including a different predetermined number of series coupled stages. One section is used to process exponent values or long mantissa values. The other section includes another number of series coupled stages connected to process mantissa values of the floating point operands.

The unit further includes control circuits interconnecting both arithmetic and logic unit sections, and which couples the carry look ahead circuits. The control circuits, in response to signals from the microprogrammed control section, selectively split and link, respectively, the two sections for operation as a single unit for processing mantissa values and as two units for processing independently exponent and mantissa values.

The control circuits selectively inhibit and enable the propagation of carries generated by the carry look-ahead circuits through the two arithmetic and logic unit sections when they are operated independently (i.e., split) and together as one section, (i.e., linked).

In the preferred embodiment of the present invention, the control store section includes an addressable control store including sequences of microinstruction words. In accordance with the present invention, each microinstruction word includes a one-bit field coded to specify whether the two sections are being operated independently (split) or together as a single section (linked) during the cycle of operation that particular microinstruction word is addressed and read out from the control store. That is, each CRSPLT field of microinstruction word, upon being read out from the control store generates signals which condition the various control circuits within the microprogrammed controlled processing unit for operation as two sections or as a single section.

In accordance with the present invention, the control circuits also can be conditioned under microprogram control to accommodate single bit shifting of long mantissa values. In this case, the two sections are linked together at the intersection between the two sections by the control circuits. Of course, when a shifting of the exponent or mantissa value is required, the control circuits under microprogram control cause a break between the two sections. At the break, the control circuits introduce a zero value into the particular value being shifted, (i.e., value moving away from the break. Also, other portions of each microinstruction word are coded to provide the appropriate carries as inputs to the carry look-ahead circuits required for proper operation.

The microprogrammed controlled arithmetic processing unit of the present invention further includes zero detector circuits used to normalize floating point operands. Normalization refers to the operation of making the mantissa value as large as possible by left shifting the mantissa value as far as possible to eliminate leading zeros while at the same time reducing the exponent value by one for each left shift. The zero detector circuits includes circuits for generating a shift count specifying the number of leading zeros digits in the mantissa value and for generating and storing an output signal indicating when the mantissa value contains all zeros. The zero detector circuits are coupled to a predetermined output terminal of each stage of both sections to receive a control signal therefrom. Each arithmetic and logic stage includes circuits which force the control signal at the output terminal to a binary ONE when the digit output of the stage associated therewith has an output value or result of zero.

In accordance with the teachings of the present invention, the control circuits apply input signals to the zero detector circuits for selectively conditioning the circuits to examine control signals from all stages of both sections or to examine only the control signals from the stages of the mantissa section.

This arrangement enables the microprogrammable arithmetic and logic unit to establish whether a long or short mantissa value contains all zeros notwithstanding what operations were being performed by both sections. Since the zero indication is stored by the detector circuits, it is available for testing during a subsequent cycle of operation.

By being able to split and link the two sections in accordance with the present invention, during each cycle of operation, independent operations involving exponent and mantissa values are able to proceed in parallel. This permits arithmetic instruction processing to proceed at essentially the same rate as if such processing were being carried out by two separate units.

The novel features which are believed to be characteristic of the invention, both as to its organization and method of operation, together with further objects and advantages, will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIG. 3 shows in block diagram form the apparatus of the present invention.

FIG. 7 shows the format of the microinstruction words in accordance with the present invention included within the control store section of FIG. 2.

FIG. 8 is a flow chart used in explaining the operation of the present invention.

DESCRIPTION OF THE PREFERRED EMBODIMENT

Figure 1:
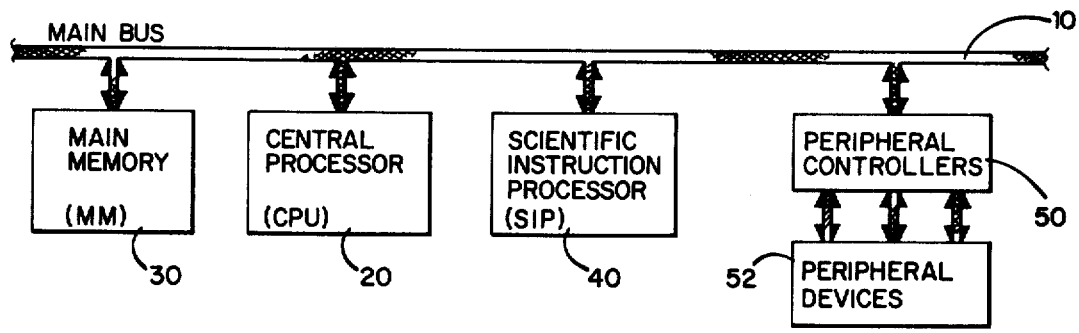
FIG. 1 is a block diagram of a system which utilizes the apparatus of the present invention.

FIG. 1 illustrates a system which utilizes the apparatus of the present invention. Referring to the Figure, it is seen that it includes a main bus 10 which couples to a main memory 30, a central processor 20, a scientific instruction processor (SIP) 40 and various peripheral controllers, such as controller 50 which controls the operation of a number of peripheral devices 52. Any one of the devices coupled to the bus 10 may address main memory 30 or any other unit connected to the bus. As shown herein, the bus 10 includes a number of control lines, address lines and data lines for transmission of instructions and data. For further information regarding the operation of the system of FIG. 1, reference may be made to U.S. Pat. No. 3,993,981.

Figure 2:
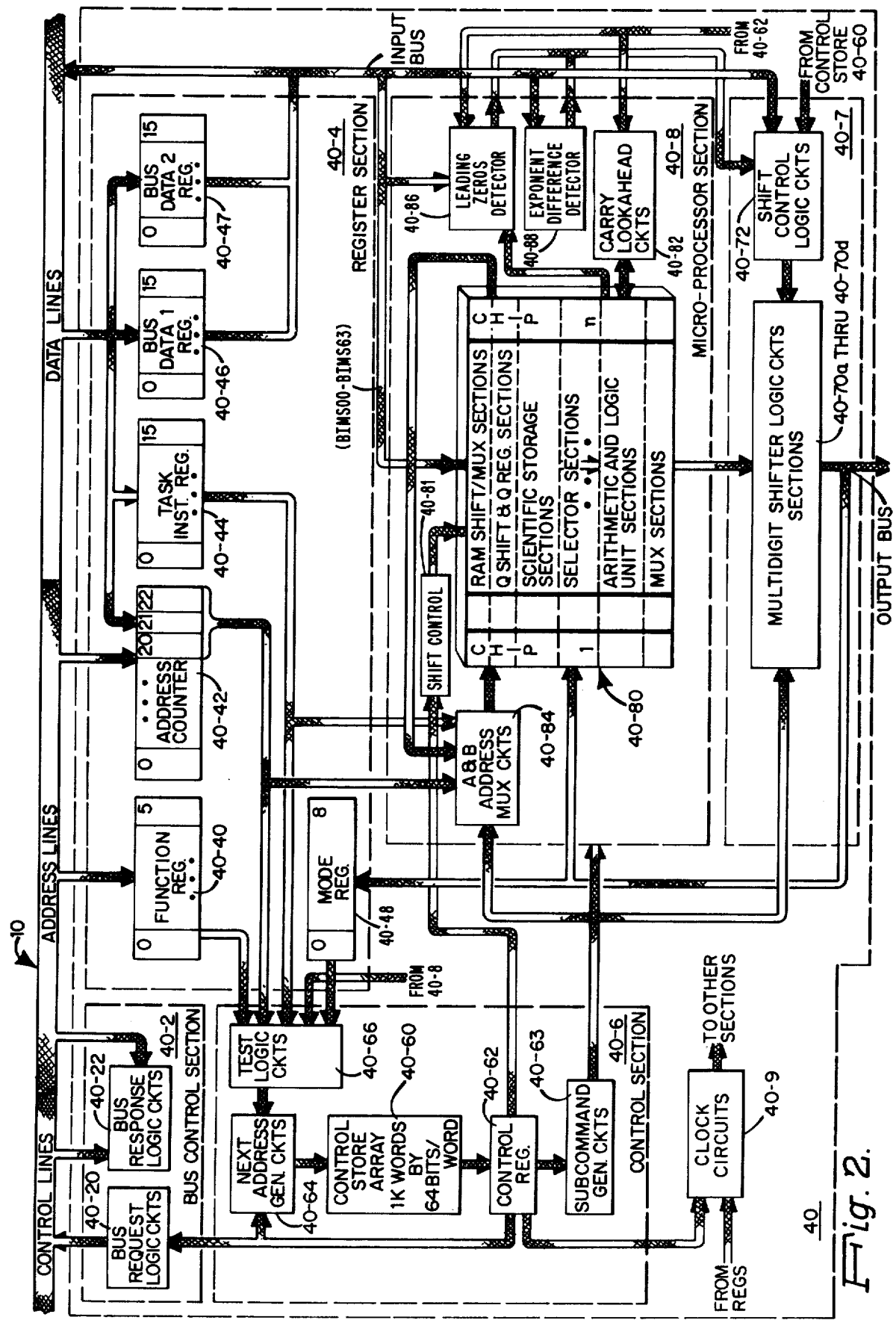
FIG. 2 is a block diagram of a scientific processor of FIG. 1 which includes the apparatus of the present invention.

FIG. 2 illustrates in block diagram form the main sections of scientific instruction processor (SIP) 40 which relate to the apparatus of the present invention.

SIP Sections and Bus Control Section 40-2

Referring to FIG. 2, it is seen that the SIP 40 includes a number of sections. The sections are a bus control section 40-2, a register section 40-4, a control store section 40-6, a shift logic circuit section 40-7, and a microprocessor section 40-8. The section 40-2 includes bus request logic circuits and bus response logic circuits of blocks 40-20 and 40-22 respectively. These circuits enable the SIP 40 to communicate over bus 10 under the control of section 40-6.

Register Section 40-4

The section 40-4 includes a plurality of registers 40-40 through 40-48 connected as shown. Four of these registers 40-40, 40-42, 40-44 and 40-48 provide input signals to test logic circuits of a block 40-66 of section 40-6. The function register 40-40 is a 6 bit register that stores a function code applied to the address lines of bus 10 during an input or output bus cycle of operation. Thereafter, SIP 40, under microprogram control, examines the contents of the register 40-40 by the test logic circuits 40-66 and executes the command specified. The microprogram routines selected define which information and control the transfer of that information between bus 10 and the various registers, buses and sections of SIP 40. The address register 40-42 is a 23 bit register which normally is used for storing a main memory operand address received via the address lines of bus 10 when SIP 40 accepts an output command from CPU 20.

The next register 40-44 (task register) is a 16 bit register that is used to store a first word of a scientific instruction received from the data lines of bus 10 when SIP 40 accepts an output command from CPU 20. The SIP 40 under microprogram control decodes the first instruction word via the circuits included in the next address generation circuits block 40-64, producing the starting address of the microprogram routine required for processing that instruction. Also, certain bits of this register are used to specify which scientific accumulator register is to be used. For example, bit positions 2 and 3 specify the scientific accumulator register used as an A operand source/result destination for the current instruction. Task register bit positions 14 and 15 specify the scientific accumulator register that is used as a B operand (effective address) for the current instruction.

The mode register 40-48 is an 8 bit register which stores information received from CPU 20. The information is initially received from the data lines of bus 10 and loaded into the bus data register 1 40-46. Thereafter, the contents of register 40-46 are transferred through sections 40-8 and 40-7 and loaded into register 40-48. The information is used to control the execution of those microinstruction sequences sensitive to operand lengths or to round/truncate modes of operation.

The bus data registers 40-46 and 40-47 designated as BD1 and BD2, are 16 bit registers that are used to store information received from the data lines of bus 10. Register 40-46 normally receives data resulting from a single word operations (e.g., instruction word from CPU 20) while register 40-47 normally receives data resulting from double word operations (second word of a double integer from CPU 20).

Control Section 40-6 and Microinstruction Format

The control section 40-6 includes a control store 40-60 constructed from 1024 read only storage (ROS) locations, each including 64 bits, a ROS local register 40-62 for storing a microinstruction word read out of control store 40-60 during a cycle of operation, subcommand generator circuits 40-63 for decoding and distributing control signals to the various portions of SIP 40, ROS next address generation circuits 40-64 and the test logic circuits of block 40-66. As explained herein, the circuits 40-64 normally generate the address of the next location as a function of a next address field of the microinstruction word and output signals from the test logic circuits 40-66. That is, the test logic circuits 40-66 select one of 64 possible test conditions based upon the coding of another field of the microinstruction word. The output signals generated in conjunction with the next address field are used to form the next address.

Additionally, as mentioned, the circuits 40-64 also generate the next address to the starting location of the microprogram for processing the instruction by decoding the instruction word stored in task register 40-44. For the purpose of the present invention, the test logic circuits 40-66 and address generation circuits 40-64 can be considered conventional in design. For example, they may take the form of circuits described in U.S. Pat. No. 3,909,800 which is assigned to the same assignee as named herein.

The various fields mentioned are illustrated in the format of the microinstruction word of FIG. 7. Referring to the Figure briefly, it is seen that each microinstruction word includes 19 distinct fields designated DA through CK. These fields are used as follows:

1. The Direct Address (DA) field includes bits 0 through 3 of the microinstruction word. This field supplies a direct address that is used to select one of the 16 accumulators contained within the scientific storage.

2. The A-Select (AS) field includes bits 4 and 5 of the microinstruction word, and is used to select which one of the four inputs to the A address multiplexer circuits 40-840.

3. The B-Select (BS) field includes bits 6 and 7 of the microinstruction word, and is used to select which one of the four inputs to the B address multiplexer circuits 40-842.

4. The Exponent Source (ES) field includes bits 9 through 11 of the microinstruction word, and controls the adder input multiplexers for bits 56 through 63 of the floating point word (i.e., the exponent portion of the word). Therefore the ES field determines the operand source for the A and B inputs of the adder unit associated with each exponent digit.

5. The Mantissa Source (MS) field includes bits 13 through 15 of the microinstruction word, and controls the adder input multiplexers for bits 0 through 55 of the floating point word (i.e., the mantissa portion of the word). Therefore, the MS field determines the operand source for the A and B inputs of the adder unit associated with each mantissa digit.

6. The External Bus Function (BF) field includes bits 16 through 19 of the microinstruction word, and is used to control various processor operations associated with the external bus (interface).

7. The Shift Control (SC) field includes bits 21 through 23 of the microinstruction word, and is used to control the type of operations performed by the multidigit shifter circuits.

8. The Exponent Function (EF) field includes bits 25 through 27 of the microinstruction word. These three bits provide controls for all operations within the arithmetic logic unit associated with each exponent digit (i.e., bits 56 through 63 of the floating point word).

9. The Mantissa Function (MF) field includes bits 29 through 31 of the microinstruction word. These three bits provide control for all operations within the arithmetic logic unit associated with each mantissa digit (i.e., bits 0 through 55 of the floating point word).

10. The Test Condition (TC) field includes bits 32 through 35 of the microinstruction word. This field is used in conjunction with a Branch Mask (BM) field to select the specific test function that will be used in generating the next control store address.

11. The Branch Mask (BM) field includes bits 36 through 39 of the microinstruction word. As mentioned, this field is used in conjunction with the TC field to select the specific test function that will be used in generating the next address.

12. The Exponent Destination (ED) field includes bits 41 through 43 of the microinstruction word. This field controls the three sets of multiplexers associated with the exponent portion of the floating point word (i.e., bits 56 through 63), thereby controlling all data movement and shift operations within the microprocessor ALU (exponent digits).

13. The Mantissa Destination (MD) field includes bits 45 through 47 of the microinstruction word. This field controls the three sets of multiplexers associated with the mantissa portion of the floating point word (ie., bits 0 through 55); thereby controlling all data movement and shift operations within the microprocessor ALU (mantissa digits).

14. The General Purpose (GP) field includes bits 48 through 53 of the microinstruction word. The GP field is used to generate either constants or SIP subcommands, depending on the state of bit 48 (i.e., bit 48 true—generate subcommands, bit 48 false—generate constants).

15. The Next Address (NA) field includes bits 54 through 63 of the microinstruction word and defines the next sequential address.

16. The Matrix Control (MC) field includes bits 8 and 12 of the microinstruction word. These bits determine the displacement (shift count) source for the matrix shifter circuit.

17. The Split (SP) field includes bit 20 of the microinstruction word. In accordance with the teachings of the present invention, the coding of this bit determines whether the exponent and mantissa portions of the floating point word are to be operated on separately or as a single operand by the stages of microprocessor Section 40-8. As explained herein, when bit 20 designated CRSPLT is a binary ONE, the mantissa and exponent portions are processed separately and independently. When the CRSPLT bit 20 is a binary ZERO, the two portions are treated as a single operand.

18. The Carry-In (CI) field includes bits 24 and 28 of the microinstruction word. These bits supply the carry inputs for the exponent and mantissa portions of the floating point word, respectively.

19. The Clock Control (CK) field includes bits 40 and 44 of the microinstruction word and establishes the control store cycle time.

Microprocessor Section 40-8

This section includes a microprocessing unit 40-80 and A and B address multiplexer circuits of block 40-84, RAM shift control circuits 40-81, a number of carry generation circuits of block 40-82, a leading zero detector 40-86, and an exponent difference detector 40-88. The section 40-80 is constructed from 17 large scale integrated (LSI) microprocessor chips designated 40-800 through 40-832 in FIG. 3. In a preferred embodiment, the chips correspond to type 2901 chips manufactured by Advanced Micro Devices Inc. Each such chip shown in block form in FIG. 4 processes 4 bits. Sixteen such chips can be interconnected as illustrated in FIG. 3 to make up a 64 bit or a 56 bit and 8 bit microprocessing unit as explained herein. The first 14 chips, corresponding to bits 0–55, store and process mantissa values of a floating point number. The next 2 chips store and process either the exponent values or additional least significant mantissa values of the floating point number. A last chip stores decimal point and sign values as explained herein.

Figure 5:
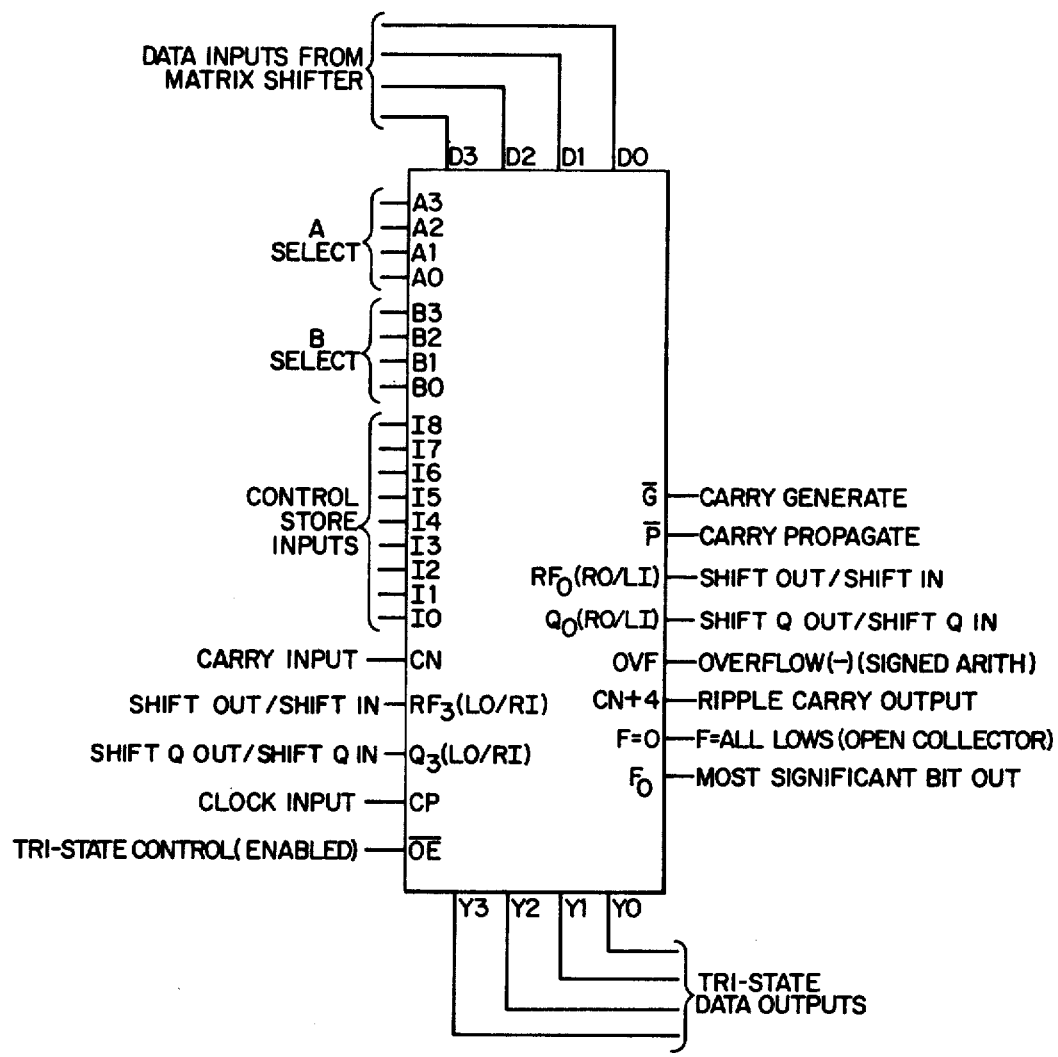
FIG. 5 shows in block form the microprocessor chip used in constructing the preferred embodiment of the present invention.

As seen from FIG. 2, microprocessor section 40-80 is divided horizontally into a number of RAM shift and multiplexer sections, Q shift and Q register sections, scientific storage sections, selector sections, arithmetic and logic (ALU) sections and output multiplexer sections. FIG. 5 shows in greater detail the sections of each chip. Additionally, the RAM shift and multiplexer sections include two 64 bit multiplexer circuits that are used for both shift operations and normal data transfers. That is, these circuits provide a direct transfer or a shift to the left or to the right of data before being loaded into the storage sections.

As illustrated in FIG. 3, the RAM shift connections between the chips storing the mantissa values and the exponent values are arranged in a predetermined manner in accordance with the present invention. That is, the RF3 RAM shift output terminal of the chip storing the least significant mantissa bit (i.e., bit 55 of chip 40-828) connects to one data input terminal of a multiplexer circuit 40-810 whose output connects to the RF0 RAM shift input of the most significant exponent bit (i.e., bit 56 of chip 40-830). The other data input terminal multiplexer circuit 40-811 connects to ground.

Additionally, as seen from FIG. 3, the RF0 RAM shift output terminal of chip 40-830 connects to one data input terminal of another multiplexer circuit 40-813 whose output connects to the RF3 RAM shift input of chip 40-828. The other data input terminal of multiplexer circuit 40-813 connects to ground. Both multiplexer circuits 40-811 and 40-813 are controlled by signals CRSPLT10 and CREDL110 generated from control section 40-6 of FIG. 2 and comprise block 40-81.

In greater detail, signal CREDL110 is forced to a binary ZERO when the contents of the exponent/guard chips 40-830 and 40-832 are being shifted right. The signal CREDL110 enables multiplexer circuit 40-811 for operation. Conversely, signal CREDL110 is forced to a binary ONE when the contents of the exponent/guard chips 40-830 and 40-832 are being shifted left. The signal CREDL110, inverted by an inverter circuit 40-815, enables multiplexer circuit 40-813 for operation.

It is the state of signal CRSPLT10 which established whether the chip stages are to be operated as two sections or as a single section. More specifically, when signal CRSPLT10 is a binary ZERO specifying "linked" operation and signal CREDL110 is a binary ONE (left shift), then the output ERRSDX10 from the RF0 terminal of the most significant bit position of exponent chip 40-830 is shifted through multiplexer circuit 40-813 into the RF3 terminal of the least significant bit position of mantissa chip 40-828. However, when signal CREDL110 is a binary ZERO (right shift), then the output ERRSDE10 from the RF3 terminal of the least significant bit position of mantissa chip 40-823 is shifted through multiplexer circuit 40-811 into the RF0 terminal of the most significant bit position of exponent chip 40-830.

When signal CRSPLT10 is a binary ONE specifying "split" operation and signal CREDL110 is a binary ONE (left shift), then a binary ZERO (ground) is shifted through multiplexer circuit 40-813 into the RF3 terminal of the least significant bit position of mantissa chip 40-828. However, when signal CREDL110 is a binary ZERO (right shift), then a binary ZERO is shifted through multiplexer circuit 40-811 into the RF0 terminal of the most significant bit position of exponent chip 40-830.

Also, as illustrated in FIG. 3, shift connections between the chips storing the mantissa values are arranged in a predetermined manner in accordance with the invention of the patent application of David E. Cushing cited in the introductory portion of this specification. That is, the Q3 shift output of each chip connects to the input Q0 of every third chip (e.g., the Q3 output of chip 1 connects to the Q0 input input of chip 4). This allows the right shifting of 8 bit positions (2 hexadecimal digits) within a single shift cycle of operation. The Q shift connections between the chips storing the exponent values are arranged in a similar manner.

The Q shift and Q register sections include one 64 bit multiplexer circuit and a 64 bit Q register for storing the bits of the multiplier. The 64 bit multiplexer enables a direct transfer or a shift to the left or to the right of the multiplier bits before being loaded into the Q register.

The scientific storage sections contain 16 64 bit storage locations wherein two separate locations of the 16 locations can be accessed simultaneously to provide both an A and B operand. As explained herein, the locations are addressed by the A and B address multiplexer circuits of block 40-84. The locations 1, 2 and 3 serve as scientific accumulators SA1, SA2 and SA3 while the remaining locations are used for temporary storage. As explained herein, accumulators are loaded with operand values by instructions in a conventional manner. Briefly, data bits of the first two words (32 bits) of a 4 word operand applied to the data lines of bus 10 by CPU 10 are loaded into bus data registers 40-46 and 40-47. The first two words data contents of these registers applied to an input bus are transferred through the shifter logic circuits 40-70 of section 40-7 without shifting and applied to an output bus. From there, the first two words are passed through the arithmetic and logic unit sections and stored in one of the accumulator locations of the scientific storage sections.

The next two words of the 4 word operand received from CPU 10 are transferred to the shifter logic circuits 40-70 and shifted by 32 bit positions through shifter section 4-7. The second two words are thereafter passed through the arithmetic and logic sections and stored in the same accumulator location. Mode register 40-48 has certain bit positions set to predetermined states for indicating to the SIP 40 the length of the stored operand (i.e., that the particular accumulator location is storing a 4 word operand). The locations assigned address $1_{16}$ and $3_{16}$ serve as scientific accumulators SA1, SA2 and SA3 as mentioned above. The locations assigned addresses $0_{16}$, $4_{16}$, $5_{16}$, $6_{16}$ and $7_{16}$ serve as working accumulators and are not pertinent to the present invention.

The selector sections include two 64 bit latches, 16 pair of 2 to 1 input multiplexers and 16 3 to 1 data input multiplexers. As explained herein, the data input multiplexers allow data signals to be applied to the ALU sections from the output bus via input terminals D0 through D3, the two latches or the Q register. The two latches hold the data signals being read out of the scientific storage sections to ensure that sufficient time is available for performing parallel operations during read and outdate operations.

The ALU sections perform all normal arithmetic and logic operations including carry generation, overflow, result sign and all ZEROS detection, ones complement and two's complement arithmetic. As explained herein, input bit signals I3 through I5 from the control store 40-60 are coded to define which one of the possible three binary arithmetic and five logic operations are to be performed.

As seen from FIG. 3, signals from the carry generate ($\bar{G}$) and carry propagate ($\bar{P}$) terminals of each of the chip sections in conjunction with the carry generation chip circuits 40-82a through 40-82f of block 40-82 form look-ahead circuits which determine when the signals applied to the carry input (CN) terminals are to be propagated through the different chip sections. Except as explained herein with respect to FIG. 4a, the carry look-ahead chip circuits of block 40-82 may be considered conventional in design and, for example, are constructed from standard integrated circuits such as type SN74S182 manufactured by Texas Instruments, Inc.

Figure 4A:
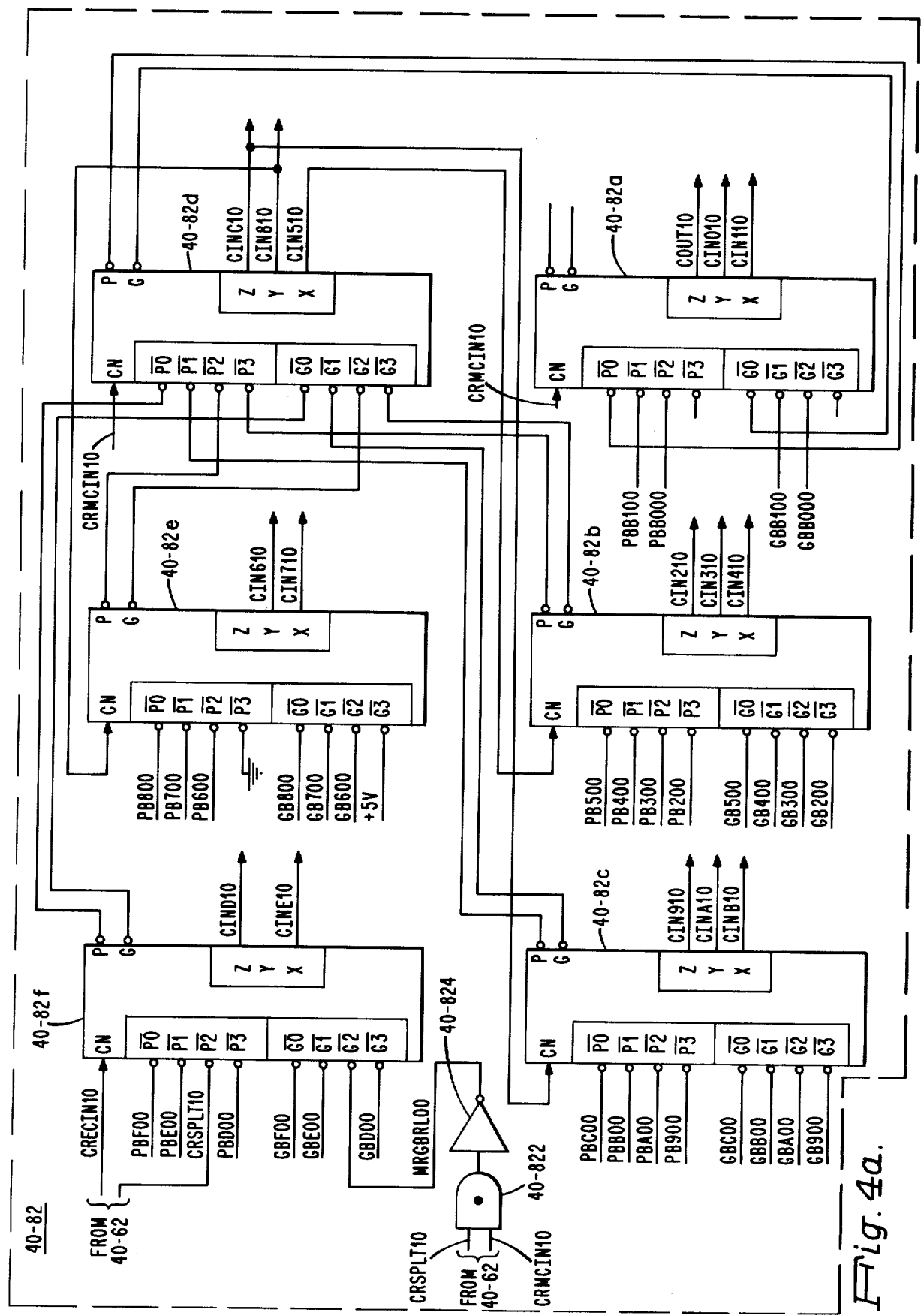
FIG. 4a shows in greater detail the carry look-ahead circuits 40-82 of FIGS. 2 and 3.

Referring to FIG. 4a, it is seen that the Figure illustrates the carry look-ahead circuits 40-82a through 40-82f in greater detail with circuit 40-82f being connected in accordance with the present invention. More specifically, the control store signals CRSPLT10 and CRMCIN10 are applied via an AND gate 40-822 and an inverter circuit 40-824 to one generate carry input terminal of circuit 40-82f. Also, the signal CRSPLT10 is applied to one propagate carry input terminal of circuit 40-82f.

As seen from FIG. 4a, the signal CRMCIN10 is also applied as a carry input (CN) to each of the circuits 40-82a and 40-82d. A further control store signal CRECIN10 is applied as a carry input to circuit 40-82f. The designated arithmetic and logic unit chip outputs $\bar{G}$ and $\bar{P}$ connect to the other sets of input terminals as shown. During subtract operations, the control store carry in signals CRECIN10 and CRMCIN10 are binary ONES to form the correct result through one's complement addition. In the case of addition operations, these signals are binary ZEROS.

However, it will be noted that carry input CIND10 to the least significant mantissa chip 40-828, the most significant exponent is controlled by the state of control store signal CRSPLT10. When signal CRSPLT10 is a binary ONE (split operation), the normal carries from the P terminals of chips 40-828, 40-830 and 40-832 are not propagated through the circuit 40-82f. Instead, the carry in signal CIND10 is generated only as a function of the state of control store signal CRMCIN10. That is, the signal MRGBRL00 is forced to a binary ONE or binary ZERO in accordance with the state of signal CRMCIN10. The other carry in signal, (CINE10, remains unchanged (i.e., generated in the normal fashion).

The output multiplexer sections include a 64 bit multiplexer. This multiplexer receives data either directly from the scientific storage sections via one of the latches or from the ALU. The multiplexer applies output signals to the input bus for distribution to the various sections of SIP 40. The last section 40-84, as seen from FIG. 3, includes an A address multiplexer circuit 40-480 and a B address multiplexer circuit 40-482. These circuits provide 4 bit A select addresses and 4 bit B select addresses which applied to the input terminals A0–A4 and B0–B4 of each of the chip sections as indicated in FIG. 3. The A select address causes the 64 bit contents of a selected location to be read out and applied as an A operand input for use by the ALU or for distribution as an output.

Four sets of input signals applied to the A address multiplexer circuit 40-480 include bits 0-3 of control store 40-60, signals MLTSSO10 through MTLSS210, bit signals 2 and 3 from task register 40-44. The control bits 4 and 5 are coded to designate which one of the four sets of inputs are to be used in generating the A select address signals applied to inputs A0–A3. Control store bits 0–3 are coded to address directly any one of the 15 scientific storage locations.

The signals MLTSS010 through MTSS210 correspond to the signals applied from the Q register bit positions 47, 51 and 55 to the Q shift out terminals of chip sections 12, 13 and 4 of FIG. 3.

The task register bits 2 and 3 are used to address one of the three scientific accumulator locations having addresses 1 through 3 that is used to store A operand or result data. The task register bits 14 and 15 are used to address another one of the three scientific accumulator locations used to store B operand source data.

The B select address causes the 64 bit contents of the location selected to be read out and applied as a B operand for use by the ALU or for distribution as an output. The four sets of input signals applied to the B address multiplexer circuit 40-482 include control store bits 6 and 7, control store bits 60 through 63, task register bit signals 2 and 3 and task register bit signals 14 and 15. The last two sets of inputs perform the same operations as indicated above with respect to A address multiplexer circuit 40-480. Control store bits 6 and 7 are coded to designate which set of inputs are to be used in generating the B select address signals applied to inputs B0–B3. Control store bits 60–63 are coded to address any one of the 16 scientific storage locations.

Shift Logic Circuit Section 40-7

This section is used for shifting either the exponent or mantissa portion of a floating point number prior (e.g., normalization) or during the execution of a scientific instruction. As seen from FIG. 3, this section includes four 16 by 16 multidigit shifter matrix chips 40-70a through 40-70d and logic circuits of block 40-72. The shifter networks for the purpose of the invention may be considered conventional in design. For example, they may take the form of the matrix shifter disclosed in U.S. Pat. No. 3,818,203.

The data input lines I0 through I15 of the shifter matrix chips 40-70a through 40-70 d connect to the input bus for receiving the data bits (exponent or mantissa portion) of the number to be shifted. The particular type of operation (e.g., shift, right rotate arithmetic) to be performed is defined by the coding of control store bits 21 through 23 which are applied to the function input terminals S0–S1 and R0–R1 of the matrix shifter chip 40-70a through 40-70d.

As seen from FIG. 3, each matrix shifter chip includes a set of displacement input terminals D0–D3 which control the displacement of bits from the data input lines I0 through I15 to a set of data output lines I0 through I15 to a set of data output lines O0 through O15 (i.e., from the input bus to the output bus). For example, it is assumed that the control store bits 21 through 23 are coded to have a value of 110 (specifying a right shift operation) and the displacement value is coded to have a value 0001 (single digit shift). Under these conditions, the bit applied to the I0 input terminal (i.e., bit 0) is displaced one bit position and applied to output terminal 01. However, since output terminal 01 corresponds to output bus bit 4, bit 0 is displaced by four bits or one hexidecimal digit as required by the displacement code value of 0001.

The circuits of block 40-72 generate the coded displacement values. As explained herein with respect to FIG. 4b, such circuits include multiplexer chips, conventional in design, for selecting signals from other sources such as the leading zeros detector circuit 40-86 for normalizing operations, the exponent difference detector circuit 40-88 for equalization operations, which specify how many digit shifts are to be performed, and a constant generator circuit.

Figure 4B:
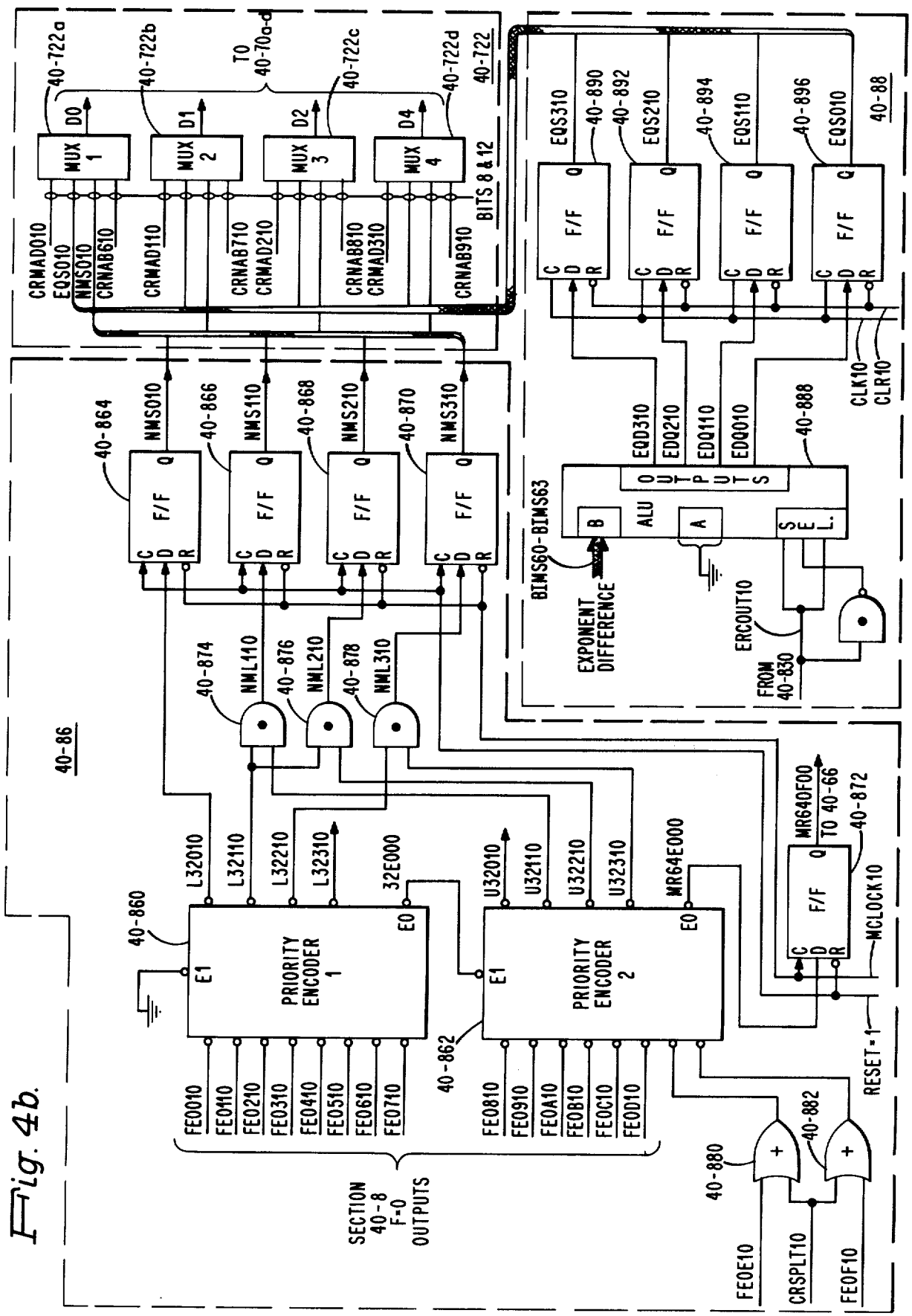
FIG. 4b shows in greater detail the leading zero detector 40-86, the exponent difference detector 40-88 and shift control logic circuits 40-72 of FIGS. 2 and 3.

As seen from FIG. 4b, the multiplexer circuits 40-722a through 40-722d receive a different set of input signals from the leading zeros detector circuit 40-86, the exponent difference detector circuit 40-88, control store bit positions 0-3 and control store bit positions 60 through 63. As indicated, the selection of a particular set of input signals is established by the coding of control store bits 8 and 12 (e.g., "00" selects signals CRMAD010-CRMAD310, while "11" selects signals CRNAB610-CRNAB910). The displacement value outputs D0-D3 of the circuits 40-722a through 40-722d are applied to the D0-D3 terminals of each of the shift matrices 40-70a through 40-70d.

As seen from FIG. 4b, the leading zeros detector circuit 40-86 includes a pair of priority encoder circuits 40-860 and 40-862, four normali-ation flip-flops 40-864 through 40-870, a zero flip-flop 40-872 and a plurality of AND gates 40-874, 40-876 and 40-878. Additionally, in accordance with the present invention, a pair of OR gates 40-880 and 40-882 are connected to selectively apply output signals generated by the exponent chips 40-830 and 40-832 in accordance with the state of control store signal CRSPLT10 as explained herein.

The series connected priority encoder circuits 40-860 and 40-862 are connected to receive the F=0 output signals from each of the chips 40-802 through 40-832. As explained herein, each chip forces the F=0 output signal to a binary ONE to indicate the detection of a zero digit output result. The priority encoder circuits 40-860 and 40-862 convert the 16 F=0 output signals into a shift count indicative of the number of leading zero digits in the mantissa. The shift count is stored in flip-flops 40-864 through 40-870.

More specifically, each encoder circuit constructed from SN74148 circuits manufactured by Texas Instruments, Inc. converts eight input signals to a three bit binary (octal) code. The octal coding is expanded by connecting the enable output E0 of circuit 40-860 to the enable input E1 of circuit 40-862. The outputs from encoder circuits 40-860 and 40-862 are combined within AND gates 40-874 through 40-878 to generate the four bit shift count having a value 0-15.

As seen from FIG. 4b, the state of control signal CRSPLT10 allows testing of mantissa bits 0-55 or the testing of bits 0-63 for zeros. When control signal CRSPLT10 is a binary ONE, the last two F=0 values are forced to binary ONES for indicating that the last two digits are ZEROS. This means that when bits 0-55 are all ZEROS, a not equal zero signal MR64E000 switches to a binary ZERO which causes the ZERO flip-flop 40-872 to switch to a binary ZERO. The output signal MR64OF00 from flip-flop 40-872 is applied as a test input to the test logic circuits of block 40-66.

However, when control signal CRSPLT10 is a binary ZERO, the F=0 signals from the exponent chips 40-830 and 40-832 are applied as the last two digit inputs to encoder circuit 40-862.

The exponent difference detector circuit 40-88 includes an ALU function generator circuit 40-888 constructed from a 74S381 circuit manufactured by Texas Instruments, Inc., and four equalization flip-flops 40-890 through 40-896. The generator circuit 40-888 operates to convert the signals applied to its B input terminals representative of a positive or negative exponent difference to an absolute value.

The generated shift count value is stored in the equalization flip-flops 40-890 through 40-896 and specifies how many right digit shifts the mantissa value having the small exponent must be shifted to equalize the exponent values of the two operands being added or subtracted. In greater detail, a carry signal ERCOUT10 is forced to a binary ZERO during the subtraction of the exponent values when there is a negative difference therebetween. This conditions the ALU generator circuit 40-888 to subtract the exponent difference signals from the ZERO signals applied to the A input terminals.

As seen from FIG. 3, the circuit 40-72 includes a read only memory (ROM) 40-720 function/constant generator circuit which is shown as being directly connected to the shifter circuits for ease of explanation. Signals from control store 40-60 are applied to the input circuits of the ROM circuit 40-720. The circuit 40-720, conventional in design, generates a constant representative of a shift count specifying how many digit shifts (mantissa digits) must be performed by the shifter 40-70. Thus, the ROM circuit 40-720 also operates to convert the set of signals applied to its input circuits to a shift count.

Figure 6:
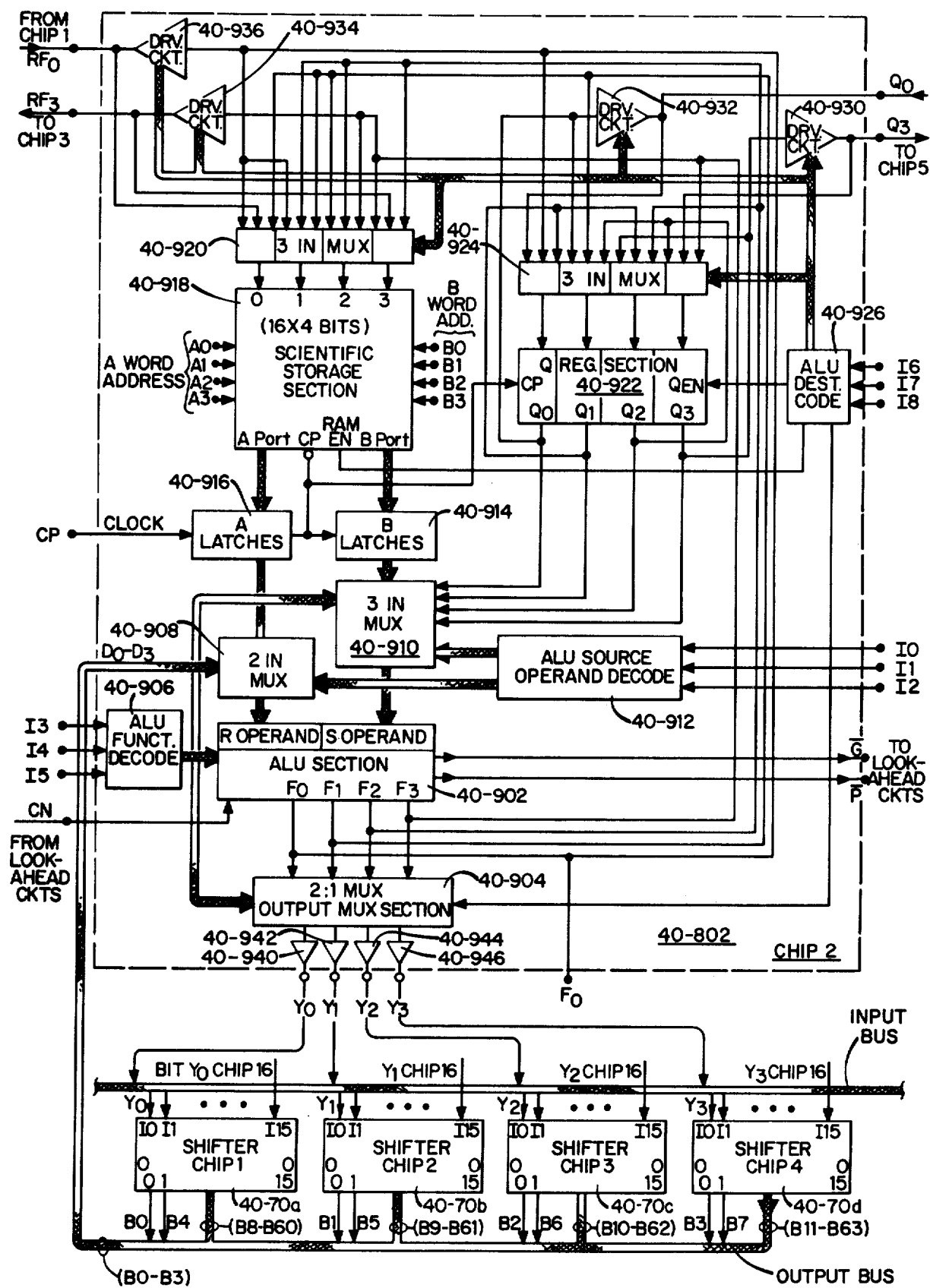
FIG. 6 shows in detail the microprocessor chip of FIG. 5 and apparatus of FIG. 3.
Figure 2:
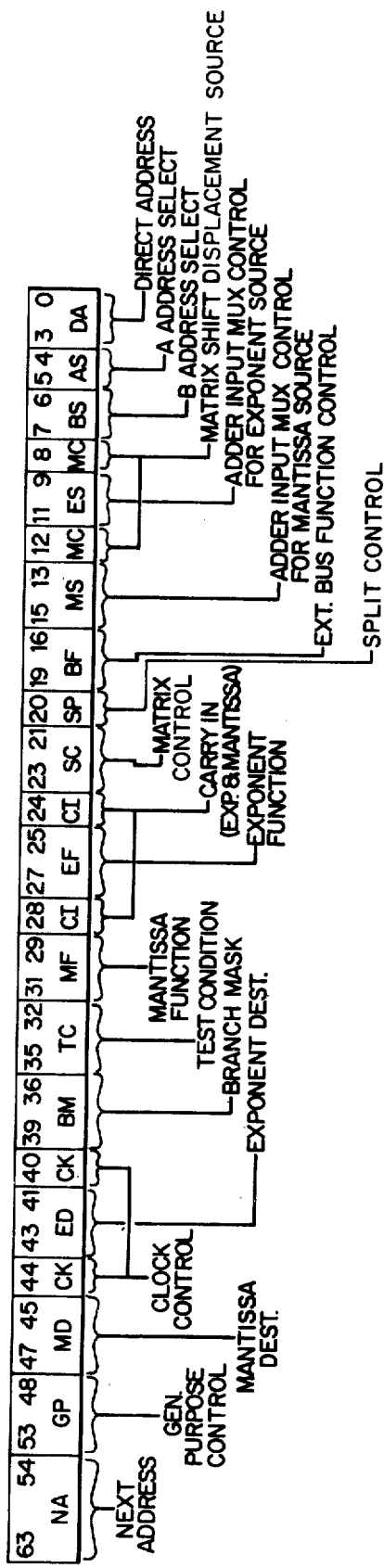

Microprocessor Chip FIGS. 5 and 6

The chip which is used in constructing the microprocessor sections of FIGS. 2 and 3 will now be discussed in greater detail with reference to FIGS. 5 and 6. Referring first to FIG. 5, it is seen that each chip has 38 pin connections which include connections of receiving an enabling voltage (connection $\overline{OE}$ and a clock input (connection CP). The pin connections designated D0-D3 are connected to receive data signals from the output bus. The pin connections P and G apply output signals to one of the stages of the carry look-ahead circuits. The carry in (CN) pin connection receives an input signal from such look-ahead circuits as mentioned herein. A further carry out pin connection (CN+4) is used to provide a carry output in the case of a subtract operation.

The shift out/shift in (RFO) pin connection receives an input signal from the shift out/shift in (RF$_3$) pin connection of a preceding chip. The shift Q out/shift Q in (Q0) pin connection receives an input signal from the shift out/shift in (Q3) pin connection of a preceding chip. The function signal zero (F=0) connection provides the detection of a ZERO result. The overflow (OVF) pin connection, the most significant bit out (FO) pin connections provide additional indications which are not pertinent to the present invention.

The pin connections Y0-Y3 are connected to provide output signals to the shifter matrix chips while the pin connections I0-I8 are connected to receive control signals generated from control store microinstruction fields MS, MF and MD or ES, EF and ED of FIG. 7 for mantissa digit or exponent digits, respectively. The pin connections A0-A3 and B0-B3, as mentioned previously, are connected to receive the A select and B select address signals from the circuits of block 40-84.

Now referring to FIG. 6, it is seen that each chip represented by chip 2 includes a 16 word by 4 bit RAM 40-918 and a high speed ALU 40-902. Under the control of the 4 bit address applied to the pin connections A0-A3, the contents of any one of the 16 word locations are read out to a set of A port terminals. Similarly, under the control of the 4 bit address applied to pin connections B0-B3, the contents of any one of the same 16 word locations are read out to a set of B port terminals.

When enabled by a signal applied to a RAMEN input by the ALU destination decode circuits of block 40-926, new data signals applied via a three input multiplexer circuit 40-920 are written into the word location defined by the B select address signals. As seen from FIG. 6, the three input multiplexer circuit 40-920 inputs are connected so as to allow the input signals from the ALU 40-902 output terminals F0-F4 to be shifted right one bit position, shifted left one bit position or not shifted in either direction under control of the circuits of block 40-926 before being written into the designated storage location.

The A port output terminals and B port output terminals, connect to the set of A latches and set of B latches respectively. These latches store the signals transferred thereto during the interval when the signal applied to the clock input CP is a binary ZERO (i.e., low). This eliminates the possibility of any race conditions occurring during the interval when new data is being written into RAM 40-918. As mentioned, the ALU, conditioned by the signals applied to pin connections I3-I5 decoded by the circuits of block 40-906, is able to perform any one of three binary arithmetic or five logic operations upon the two 4 bit input signals applied to R operand and S operand input terminals.

The R operand input terminals receive signals directly from pin connections D0-D3 or from the A latches 40-916 via a 2 input multiplexer circuit 40-908 as shown in FIG. 5.

The S operand input terminals receive signals from the A latches 40-916, the B latches 40-914, or from the Q register 40-922 via a 3 input multiplexer circuit 40-910. The multiplexers 40-908 and 40-910 is under the control of the signals applied to pin connections I0-I2 which are decoded by the operand decode circuits of block 40-912. The pin connections D0-D3 are used to load data signals into the working registers of the chip and to modify the contents of RAM locations. The Q register 40-922 is a 4 bit register which, as previously mentioned, is used to store the multiplier during multiplication operations.

The ALU output signals present at terminals F0-F3 are applied to one input of a 2 input output multiplexer circuit to one input of the 3 input multiplexer circuit 40-920 and to one input of a 3 input multiplexer circuit 40-924 associated with the Q register 40-922. The actual destination (i.e., data output at pin connections Y0-Y3, input to RAM 40-918 or Q register 40-922) is selected by the signals applied to pin connections I6-I8 which are decoded by the circuits of block 40-926.

As seen from FIG. 6, the multiplier circuit 40-904 is used to select signals read out from the A port of RAM 40-918 or signals from the output terminals F0-F4 of ALU 40-902. The selection proceeds under the control of the signals applied to the pin connections I6-I8 as mentioned previously. As previously mentioned, the multiplexer circuit 40-920 provides inputs from three sources, including the ALU 40-902.

The above allows the ALU outputs to be stored nonshifted, shifted right one position (i.e., $\div 2$) or shifted left one position (i.e., $\times 2$). It will be noted that the shifting circuits include the pin connections RF0 and RF3 which connect to the buffer driver circuits 40-934 and 40-946 respectively. In the shift left mode, the driver circuit 40-934 is enabled and the RFO multiplexer input is enabled. In a shift right mode, the driver circuit 40-936 is enabled and the RF3 multiplexer input is enabled. In the no shift mode, both driver circuits 40-934 and 40-936 are not enabled and the multiplexer inputs mentioned are not selected. The selection of operations proceeds under the control of the signals applied to the pin connections I6-I8.

Similarly, the Q register 40-922 is also connected to the 3 input multiplier circuit 40-924 which also includes shifting circuits. This allows the ALU output signals to be stored nonshifted, shifted right one position (i.e., $\times 2$) or shifted left one position (i.e., $\div 2$). The shifting circuits include pin connections Q0 and Q3 which connect to the buffer driver circuits 40-932 and 40-930, respectively. In the shift left mode, the buffer circuit 40-932 is enabled and the Q0 multiplexer input is enabled. In the shift right mode, the buffer circuit 40-930 is enabled and the Q3 multiplexer input is enabled. In the no shift mode, both the buffer circuits 40-932 and 40-930 are not enabled and the multiplexer inputs mentioned are not selected. Again, the shifting operations are selected under the control of the signals applied to the pin connections I6-I8. Data signals are clocked into the Q register 40-922 under the control of the signals applied to the clock input connection CP.

FIG. 6 also illustrates the manner in which the output pin connections Y0-Y3 of chip 2 connect to a different one of the input terminals of each of the multiposition shifter circuit chips 40-70a through 40-70d via the input bus. Additionally, FIG. 6 shows the shifter circuit pin connections from the output bus to the data input pin connections D0-D3 of chip 2.

The clock circuits of block 40-9 generate clocking signals which are applied to the various sections of FIG. 1. These circuits, for the purpose of the present invention, may be considered conventional in design. The circuits 40-9 receive input signals from different ones of the registers and from control register 40-9. The signals from the registers are combined with the signals from register 40-9 to control the rate and operation of the clock circuits 40-9. For example, as explained herein, the absence of signals from different ones of the registers stall the operation of the clock circuits 40-9.

DESCRIPTION OF OPERATION

With reference to FIGS. 1-7, and the flow chart of FIG. 8, the operation of the present invention will now be described. Before the example, it is desirable to discuss briefly the manner of performing floating point addition and subtraction. All numbers in hexadecimal floating point notation have a mantissa which is less than one and an exponent, the portion of the number which indicates its size. The range of exponents is from $+63_{10}$ through $-64_{10}$ in the present system.

For numbers greater than one, the hexadecimal point is moved to the left (i.e., divide by 16) until the left most nonzero digit 1 is to the right of the hexadecimal point. For numbers which are already fractions, the hexadecimal point is moved to the right (i.e., multiply by 16) until the first nonzero digit is encountered. In such cases, all numbers are fractions greater than or equal to one-half but less than 1 and are termed to be "normalized". For additional material relating to normalization, reference may be made to Chapter 15 of the text, "The Logic of Computer Arithmetic" by Ivan Flores, published by Prentice-Hall, Inc., copyright 1963.

In the present example, it is assumed that the operation is a subtract involving an operand value stored in scientific accumulator 1 (SA1), and an operand value stored in a memory location specified by the effective address of an instruction being processed. The memory operand is assumed to be short (i.e., 2 words in length) and not normalized while the SA1 operand is assumed to be long (i.e., 4 words in length) and normalized.

Reference will now be made to the flow chart of FIG. 8. The Figure illustrates diagrammatically the operations performed during various cycles of operation. The various abbreviations used and their significance are as follows:
1. S=sign;
2. M=mantissa;
3. X=exponent;
4. T=temporary register having address 0;
5. BI=input bus;
6. BO=output bus;
7. (A)=contents of location specified by the address in parentheses (i.e., A).

Now referring to the flow chart of FIG. 8, it is seen that the microprocessor section 40-8 of the SIP 40 under microprogram control performs the operations during a cycle of operation designated as $ SAD-MEM wherein a microinstruction word stored in location 3C4 is read out to control register 40-62. This occurs following the SIP's receipt of an operand address from CPU20 being loaded into register 40-42. That is, the clock circuits 40-9 are "stalled", preventing the read out of a next microinstruction word from location 3C4 until receipt of a signal from register 40-42 indicating that the register has been loaded via bus 10. At that time, the circuits 40-9 are enabled for generation of further clocking signals which causes the read out of the microinstruction word from location 3C4.

The microinstruction word read out is coded to have the DA field specify address #0, the B address select (BS) field specify direct, the mantissa source (MS) field specify the Q register, the mantissa function (MF) specify AND and the mantissa destination (MD) field specify the RAM storage.

During this cycle, the first 56-bit mantissa portion of temporary accumulator location MT is addressed by the DA field applied via the B address multiplexer circuits 40-482. The contents of the Q register are ANDED which provides a ZERO result. This ZERO result is written into the first 56 bit positions of location MT addressed by the multiplexer circuits 40-482. This operation results in forcing all ZEROS into the mantissa portion of the temporary location MT selected by the coding of the DA field. The next address NA field of the microinstruction conditions the circuits 40-64 to address location 041 as seen in FIG. 8.

During the next cycle of operation, the microinstruction word stored in location 041 is read out into control register 40-62. The bus function (BF) field of this word is coded to cause the bus control circuits of block 40-2 to generate a memory read request on bus 10 specifying that main memory 30 read out two operand words stored at the address previously loaded into register 40-42 for transfer to SIP40. For the purpose of the present invention, it can be assumed that this operation is carried out in a conventional manner.

As seen from FIG. 8, the next address field of the microinstruction word causes the control store 40-60 to sequence to location 032. However, before sequencing occurs, the clock circuits 40-9 stall their operation until the first operand word from main memory 30 is loaded into BD1 register 40-46. Upon the occurrence thereof, the contents of the micoinstruction word stored in location 032 are read out to register 40-62 for decoding.

The microinstruction word is coded as follows: The DA field specifies address 0; the AS, BS and MC fields each specifies the DA field as the address source; the exponent source and mantissa source fields both specify the D inputs; the exponent function and mantissa function fields both specify OR; the exponent destination (ED) field specifies RAM right shift; and the matrix control (SC) field specifies right rotate. As indicated in FIG. 8, the split bit field of the microinstruction is coded to specify "split" operation in accordance with the present invention, (CRSPLT10 is a binary ONE). Up to this point, it did not matter what value this field contained in that the types of operations being performed under microprogram control were not affected. In such instances, the split control field is normally a binary ONE.

However, during this cycle, the exponent and sign digits received from main memory 30 having a form of a 7-bit exponent and one sign bit, (i.e., "XXXX XXXS") are converted into a form having an 8-bit exponent and 4-bit sign utilized for arithmetic operations by the SIP40 (i.e., 0XXX XXXX S000). This means that the two groups of stages are going to be operated independently to enable shifting of the sign bit(S) to be shifted right by one bit position, placing it into the most significant bit position of sign chip 40-800.

More specifically, the DA field designating address 0 is selected as the address to be applied via the A address multiplexer and B address multiplexer circuits 40-480 and 40-482 to the A and B address inputs of the stages 40-800 through 40-832. This enables read out of the contents of location MT to the input bus. As seen from FIG. 8, the first word contents of the BD1 register 40-46 are applied to the input bus. At this time the matrix shifter circuits 40-70a through 40-70d are conditioned to perform a right rotate operation of ZERO digits (i.e., pass the data through without shifting). The exponent and sign chips are conditioned to perform a one bit shift wherein the least significant bit from terminal RF3 of chip 40-832 shifted into the RF0 terminal of sign chip 40-800.

The split control bit signal CRSPLT10 conditions the multiplexer circuit 40-811 to select a binary ZERO as the value to be shifted into the most significant bit position of exponent chip 40-830, while the multiplexer circuit 40-811 is enabled for a right shift operation by signal CRED110 (i.e., set to a binary ZERO). At this time, the exponent chips 40-830 and 40-832 are conditioned by the ED field to do a one bit RAM right shift while the mantissa chips 40-802 through 40-828 are not being shifted (i.e., mantissa source, mantissa function and mantissa distination fields do not specify a right shift).

The result of the above operation is to load the exponent digits (bits 0-7) received from main memory 30 and stored in BD1 register 40-46 into the exponent chips 40-830 and 40-832 in the correct format at discussed above.

As seen from FIG. 8, during the same cycle certain bits within mode register 40-48 are selected by the test condition (TC) field to establish whether the length of the operand from memory is long or short. Since the this example, the length is short, the next address circuits 40-64 cause the microinstruction word stored in location 0C 0 to be read out into control register 40-62.

The microinstruction word is coded as follows: the AS field specifies register 40-44; the BS field specifies the DA field which stores ZEROS; the exponent source (ES) specifies A-B latches; the exponent function (EF) specifies a subtract; the exponent destination (ED) specifies the Q register; the mantissa source (MS) specifies the A latches; the mantissa function (MF) specifies ADD, the MCIN field specifies no mantissa carry in and the ECIN field specifies an exponent carry in. Additionally, the split control bit is set to a binary ONE, since the mantissa portion is to be examined.

During this cycle, the exponent values of the two operands are going to be subtracted. That is, the exponent portion of the operand stored in accumulator SA1, as specified by the instruction, and which can be assumed as having been stored in task register 40-44, and the exponent portion of the operand received from main memory 30 and stored in accumulator 0. The reason is to determine the amount of equalization shift required, if any.

The A address multiplexer circuits 40-480 are conditioned by the AS field to apply to the exponent chip stages the address within the original instruction, while the B address multiplexer circuits 40-482 are conditioned to apply the ZERO address from the DA field. The exponent chip stages are conditioned by the EF field to perform a subtract with a carry-in while, at the same time, the mantissa chip stages are conditioned to perform an ad with no carry-in.

In accordance with the present invention, the split control bit operates to keep the carry signals generated by the mantissa and exponent chip stages separate. That is, it is going to prevent the result produced by mantissa chip stages from being affected by any carries generated by the exponent chip stages and visa versa.

The above can be seen from FIG. 4b. That is, the exponent carry-in signal CRECIN10 is a binary ONE, the mantissa carry-in signal CRMCIN10 is a binary ZERO, while the split bit signal CRSPLT10 is a binary ONE. The signal CRSPLT10 inhibits any carry propagation from the previous stages (i..e., the terminal P is a binary ONE, indicative of no carry being propagated). Also, since signal CRMCIN10 is a binary ZERO, there is no generation of a carry-in and the carry-in signal CIND10 is forced to a binary ZERO. The remaining carries are generated normally (e.g., CINE10 during a subtract is a binary ONE).

As seen from FIG. 8, during this cycle, the exponent difference applied to the input bus (i.e., BIMS6-0–BIMS63) is converted into an absolute value by function generator circuit 40-888. This value (XF) is loaded into the flip-flops 40-890 through 40-896 of FIG. 4b and applied to the input bus.

Also, to the sign digit of the operand stored in SA1 is added to complement of the sign digit of the operand stored in accmulator location ZERO (i.e., ST). The result is stored in the Q register of the sign chip stage 40-800. Since is is assumed that the signs are the same (both positive), the Q bit ZERO register value will be ONE.

Additionally, the most significant digit of the mantissa portion of the operand received from main memory, applied via the B latches to the chip ALU, is tested for zero during this cycle. If it is ZERO, then the mantissa portion of the memory operand contains one or more leading ZEROS and must be normalized. Since this operand is not normalized, the F=0 output of chip 40-802 applied to the test logic circuits 40-66 is a binary ONE. The test condition (TC) field and branch mask (BM) field of the microinstruction word are coded to select the F=0 output signal for branching to the next location.

As seen from FIG. 8, the next address circuits 40-64 cause the control 40-60 to read out the microinstruction word from location 033. This microinstruction word is coded as follows: AS, BS and MC fields, each one coded to select the DA field as an address source; the mantissa source (MS) field specifies the D inputs; the mantissa function (MF) field specifies OR; the mantissa destination (MD) field specifies RAM, and the matrix control (SC) field specifies right rotate. Additionally, the split bit field is coded to specify that the groups of stages are split.

As seen from FIG. 8, before the microinstruction word can be decoded, the operation of the clock circuits 40-9 is stalled until the second word of the operand has been received from main memory 30. As a result of the previous operations, location MT contains the first 8 most significant bits of the mantissa, the most significant digit of which has a value of ZERO.

The 32 ZERO bits previously generated in location 0 (i.e. unchanged by the previous operation) together with the contents of the BD1 register 40-46 which still contains the first word of the memory operand and the BD2 register 40-47 which contains the second word are applied to the input bus as indicated in FIG. 8. These bits are passed through the shifter circuits 40-70a through 40-70d onto the output bus without modification (i.e., rotate by 0 MC=0). From there, the entire 24 bits mantissa portion of the memory operand and the 32 ZERO bits are written into location (MT) specified by the ZERO address value contained in the DA field.

During this cycle, the leading zero detector circuit 40-82 of FIG. 4b operates to examine the 56 bit or 14 digit mantissa value to determine whether it contains all ZEROS. In accordance with the arrangement of the present invention, the split control bit forces the two last digits (exponent digits) to zeros. This enables the testing of only the 14 digits of the mantissa. The result of such testing is stored in the ZERO flip-flop 40-872 for subsequent testing. Since it is assumed that the mantissa does not contain all ZEROS, flip-flop 40-872 is set to a binary ONE.

As seen from FIG. 8, the output signals generated by the encoder circuits 40-860 and 40-862 indicative of the number of leading ZEROS contained in the 14 digit mantissa is loaded into the normalization flip-flops 40-864 through 40-870. The circuits 40-64 are conditioned by the next address field of the microinstruction word to cause the control store 40-60 to address location 006.

During this cycle, the microinstruction word read out to control register 40-62 is coded as follows: the AS and BS fields both specify the DA field as an address source; the MC field specifies the NORM flip-flops as a source; the ES field specifies D inputs—A latches; the EF field specifies subtract; the ECIN field specifies a carry-in; the ED field specifies RAM-Y; the MS field specifies the D inputs; the MF field specifies OR; the MD field specifies RAM; and the SC field specifies left shift.

The 56-bit mantissa stored in location 0 as specified by the ZERO coded DA field is read out to the input bus. The least significant 2 digits (exponent) are forced to ZEROS by the general purpose control (GP) field of the microinstruction word. That is, the tristate input terminals of the two exponent chips are forced to binary ONES, while an all ZERO constant generated by a ROM chip similar to circuit 40-720 is applied to the input bus. Next, the displacement or shift count stored in the NORM flip-flops 40-864 through 40-870 is applied to the D0-D3 inputs of the shifter circuits 40-70a through 40-70d via the multiplexer circuits 40-722a through 40-722d.

The 56-bit mantissa is shifted left by the number of digits specified by the shift count and the result applied to the output bus is written back into location 0 (MT). Also, during this cycle, the count value stored in the norm flip-flops 40-864 through 40-870 is subtracted from the exponent value stored in location 0.

It will be noted that, while the state of the split control bit is a binary ONE, it is not essential in this cycle of operation. The reason is that a carry-in from the exponent chips into the mantissa chips will not affect the result since the chips are conditioned to perform an OR operation at this time. During the last part of the cycle, the test condition (TC) field and branch mask (BM) field of the microinstruction word condition the circuits 40-66 to test the state of the ZERO flip-flop 40-872. Since the mantissa bits were not all ZEROS, the control store 40-60 reads out the microinstruction word stored in location 0C9.

The microinstruction word stored in location 0C9 is coded as follows: the AS field specifies the register 40-44 as an address source (SA1); the BS field specifies the DA field which contains all ZEROS; the ES field specifies the A and B latches; the EF field specifies subtract; the ECIN field specifies a carry-in; the ED field specifies the Q register; the MS field specifies the A latches; the MF field specifies add; and the MCIN field specifies no carry-in. During this cycle, the exponent portion of the memory operand stored in location 0 selected by the DA field address is subtracted from the exponent portion of the operand stored in SA1 selected by signals in task register 40-44. The result of the subtraction is stored in the Q register of the exponent chip stages 40-830 and 40-832. The split control bit is significant to the extent of separating the carries and therefore is a binary ONE (i.e., inhibits carry into the sign chip).

As seen from FIG. 8, signals representative of the exponent difference are converted into an absolute value by function generator circuit 40-888 and stored in the EQUIZ flip-flops 40-890 through 40-896. Also, the sign digit value of the operand stored in SA1 is added without a carry to the complement of the sign digit value of the memory operand stored in location 0 for determining whether the signs are equal. Since they are, the result stored in the Q register bit ZERO of the sign chip stage 40-800 will be ONE.

During the last part of this cycle, the test logic circuits 40-66 under the control of the TC and BM fields establish the next microinstruction word to be read out from the control store 40-60. Since the operation being performed is a subtract, and the signs of both operands are the same, the control store 40-60 next enters a subtract routine. However, since the exponent difference is not zero, the next address circuits 40-64 causes control store 40-60 to read out the microinstruction word stored in location 102.

The microinstruction word is coded as follows: AS and BS fields both specify the task register 40-44 as an address source; the MC field specifies the EQUIZ flip-flops as a source; the ES field specifies the D inputs; the EF field specifies OR; the ED field specifies RAM-Y; the MS field specifies the D inputs; the MF field specifies OR; the MD fields specifies RAM; and, the SC field specifies right shift.

During this cycle, the mantissa portion of the operand stored in SA1 specified by the contents of register 40-44 is read out via the input bus and applied to the shifter circuits 40-70a through 40-70d. Thereafter, the mantissa portion is shifted right by the number of digits specified by the value stored in EQUIZ flip-flops 40-890 through 40-896 and, at the same time, insert leading zeros in place of the shifted digits.

It will be noted that the mantissa digits will be shifted into the exponent chip stages 40-830 and 40-832 through the shifter circuits 40-70a through 40-70d. Therefore, the state of the split control bit has no affect on this operation. However, it will be noted that the arrangement of the invention makes available storage within the two additional digit positions, providing increased accuracy and precision in the arithmetic operation. That is, after shifting, the least significant stages could contain digit values significant in generating the final result.

As seen from FIG. 8, the shifted mantissa portion applied to the input bus by the shifter circuits is written back into the full 64-bit positions of location SA1 specified by the task register 40-44, thereby providing for the increased precision mentioned above. Next, the address circuits 40-64 cause the control store 40-60 to read out the microinstruction word stored in location 124.

The microinstruction word read out is coded as follows: the AS field specifies as an address source the DA field which contains the value 4; the BS field specifies the task register 40-44 as an address source; the ES field specifies the A and B latches; the EF field specifies an exclusive OR; and the ED field specifies RAM-Y. During this cycle, the sign digit chip stage 40-800 is conditioned to exclusively OR the sign bit contained in location SA1 specified by the register 40-44 with a constant previously stored in location 4 specified by the DA field. This complements the sign digit value placing it in proper form. This operation is not pertinent to the present invention and will not be further discussed.

Next, the address circuits 40-64 condition the control store 40-60 to read out the microinstruction word from location 0AA. It is this microinstruction word which conditions the 16 chip stages to subtract the 64-bit operand stored in location SA1 from the 64-bit memory operand stored in location 0(MT).

The microinstruction word is coded as follows: the AS field specifies the DA field which contains all ZEROS; the BS field specifies as an address source the task register 40-44; the ES field specifies the B latches; the EF field specifies subtract; the ECIN field specifies a carry-in; the ED field specifies RAM-Y; the MS field specifies the A and B latches; the MF field specifies subtract; the MCIN field specifies a carry-in and the MD field specifies RAM-Y. In accordance with the present invention, the split control field is set to specify "link" operation. That is, the control signal CRSPLT10 is a binary ZERO.

As seen from FIG. 4a, since CRSPLT10 is a binary ZERO, the carry, and propagate signals (GP) generated by the exponent chip stages are passed on to the mantissa stages. Thus, the arrangement provides for the precision discusses above using a minimum of hardware. That is, when the values stored in the mantissa and exponent chip stages are subtracted from the 56 mantissa bits and two ZERO exponent digits, those borrow signals generated are included into the final result. The result of the subtraction is written back into location SA1.

During the subtraction, it will be noted that the result applied to the ALU's of the chip stages enable the leading zeros detector circuit 40-86 to establish whether any leading zeros were generated. Since control signal CRSPLT10 is a binary ZERO, the priority encoder circuits 40-860 and 40-862 examine all 16 digits thereby including any ZERO results generated by the exponent chip stages 40-830 and 40-832 (i.e., guard area). The generated value is stored in the NORM flip-flops 40-864 40-870 for use in the next cycle of operation for renormalizing the result.

As seen from FIG. 8, during the last portion of the cycle, the contents of mode register 40-48 are tested to establish whether the accumulator length is long (i.e., 64 bits) and not round. Since it is, the address circuits cause the control store 40-60 to read out the microinstruction word from location 112.

The microinstruction word read out is coded as follows: AS and BS fields both specify the task register 40-44 as the address source; the MC field specifies the NORM flip-flops; the ES and MS fields each specifies the D inputs; the EF and MF fields each specifies OR; the ED and MD fields each specifies RAM; and the SC field specifies left shift. Since these operations only involve shifter circuits 40-70a through 40-70d, it is unnecessary that the split control bit be set to a binary ONE which it is.

During this cycle, the result stored in location SA1 is shifted left by the number of digits specified by the contents of the NORM flip-flops applied to the D0-D3 input terminals of shifter circuits 40-70a through 40-70d. The shifter result is thereafter written into location SA1. Next, the address circuits 40-64 cause the control store 40-60 to read out the microinstruction word stored in location 056.

The microinstruction word read out is coded as follows: The AS field specifies the DA field which contains all ZEROS; the BS field specifies the task register 40-44 as the address source; the ES field specifies the A and B latches; the EF field specifies a subtract; the ECIN field specifies a carry-in; and the ED field specifies RAM-Y. During this cycle, the SIP40 subtracts the exponent value (#X) from the value previously calculated as the exponent of the result. That is, if a post normalization was performed, the result exponent is corrected during this cycle by the indicated subtraction. Again, the state of the split control bit is not material to this operation.

As seen from FIG. 8, the SIP40 enters a $YOUR MOVE cycle wherein it signals the CPU20 that it has furnished the subtraction operation.

From the foregoing, it is seen how the apparatus of the present invention is able to carry out expeditiously arithmetic operations with a minimum of apparatus and with the required degree of precision.

In addition to the above described operation, the arrangement of the present invention can be used with the apparatus disclosed in the referenced patent application of David E. Cushing. As discussed therein, certain generation of partial products which involve single bit shifts. Utilizing the apparatus of the present invention, the split control bit within the microinstruction word read out during a particular cycle of operation would be set to specify a "link". This would enable the propagation of carries from the exponent chip stages into the mantissa chip stages during addition and shift operations.

By being able to "split" and "link" the two sections of the arithmetic apparatus of the present invention during any cycle of operation under microprogram control, this permits instruction execution to be performed as efficiently as when performed by two separate units.

It will be appreciated that the convention used in allocating chip bit positions in the preferred embodiment of the present invention is one wherein the most significant bit position is designated "3" (Q3, F3). The manufacturers of microprocessor chips may use different conventions in describing their chips resulting in alterations of specific pin connections when connected in the preferred embodiment. For example, the manufacturer, Advanced Micro Devices Inc. utilizes a convention opposite to that described in connection with the preferred embodiment. Hence, the Q0, Q3 and F0, F3 pins would be interchanged when using such chips in the preferred embodiment.

It will be appreciated by those skilled in the art that many changes may be made to the preferred embodiment of the present invention. For example, the microprocessor of the present invention may be implemented with other chips such as AMD2901A, also manufactured by Advanced Micro Devices, Inc., and the MMI6701 manufactured by Monolithic Memories, Inc. It will also be appreciated that such chips may be constructed using different technologies, CML, $I^2L$, etc.

To prevent undue burdening the description with matter within the ken of those skilled in the art, a block diagram approach has been followed, with a detailed functional description of each block and specific identification of the circuitry it represents. The individual engineer is free to select elements and components such as flip-flop circuits, shift registers, etc., from his own background or from available standard references, such as "Arithmetic Operations in Digital Computers" by R. K. Richards (Van Nostrand Publishing Company), Computer Design Fundamentals by Chu (McGraw-Hill Book Company, Inc.), and Pulse, Digital and Switching Waveforms by Millman and Taub (McGraw-Hill Book Company, Inc.).

While in accordance with the provisions and statute, there has been illustrated and described the best form of the invention known, certain changes may be made to the system described without departing from the spirit of the invention as set forth in the appended claims and that in some cases, certain features of the invention may be used to advantage without a corresponding use of other features.

What is claimed is:

1. A microprogrammable arithmetic processing unit for performing an arithmetic operation upon a pair of operands, said processing unit comprising:

a microprogrammed control section including:

a cycled addressable control store including a plurality of storage locations for storing a corresponding number of microinstruction words, each including a control field coded to indicate a physical organizational characteristic of said unit; and, output register means coupled to said control store for storing a microinstruction word read out during an operative cycle of said control store;

addressing means coupled to control store for applying an address for referencing one of said plurality of storage locations during said operative cycle;

an arithmetic and logic unit including a plurality of groups of multibit microprocessor chips, each group including a predetermined number of said chips connected to operate in tandem, each chip being coupled to said output register means and including:

an arithmetic logic unit section; and, a multibit addressable random access memory section connected to said arithmetic logic unit section, each said memory section having a plurality of multibit storage locations and a multibit random access memory shift register and multiplexer section coupled to said random access memory section; and control circuit means coupled to a predetermined one of said chips included within each of said groups, said control circuit means being coupled to said output register and operative in response to each microinstruction word read out from said control store during each operative cycle to selectively interconnect said groups of chips for operation as two independent sections and as a single section in accordance with coding of said control field as required for performing said arithmetic operation upon said pair of operands.

2. The processing unit of claim 1 wherein said control circuit means includes:

a first multiplexer circuit, said first multiplexer circuit having a number of data input terminals, at least one select input terminal, an enable input terminal and at least one output terminal;

a second multiplexer circuit, said second multiplexer circuit having a number of data input terminals, a first data input terminal being connected to said output terminal of said first multiplexer circuit, at least one select input terminal, an enable input terminal and at least one output terminal connected to a first data input terminal of said first multiplexer circuit;

conductor means connecting said first data input terminals of said first and second multiplexer circuits respectively to said predetermined one of said chips included within each of said groups; and, means for coupling said select input terminals and said enable input terminals to said output register, said first and second multiplexer circuits being enabled selectively for operation in response to each microinstruction word read out from said control store during each operative cycle to interconnect selectively each said predetermined one of chips for transmitting signals between said data input terminals of said first and second multiplexer circuits as required for performing said arithmetic operation.

3. The processing unit of claim 2 wherein each of said pair of operands includes a mantissa portion and an exponent portion, each including a number of binary coded digits, a first one of said groups of chips being connected to store and operate on said digits of said mantissa portion and a second one of said groups of chips being connected to store and operate on said digits of said exponent portion; and, wherein said output terminal of said first multiplexer circuit connects to said predetermined one of said first group of chips which corresponds to the least significant digit position of said mantissa portion and said output terminal of said second multiplexer connects to said predetermined one of said second group of chips which corresponds to the most significant digit position of said exponent portion;

said first and second multiplexer circuits being selectively conditioned to transmit said signals between said least significant mantissa digit position and said most significant exponent digit position providing increased precision in operating upon said pair of operands when said first and second groups of chips are not connected to perform separate operations in parallel upon said mantissa and exponent portions.

4. The processing unit of claim 3 wherein secone data input terminals of said first and second multiplexer circuit-each is connected to apply a binary ZERO data signal for transfer to said output terminals of said first and second multiplexer circuits, and wherein said means for coupling includes:

conductor means for applying a signal representative of the coding of said control field to said select input terminals; and, circuit means for applying shift control signals generated in response to another control field of said microinstruction word to said enable input terminals, said circuit means selectively enabling said first and second multiplexer circuits for shifting the contents of said mantissa and exponent digit positions in a direction specified by the coding of said another control field.

5. The unit of claim 4 wherein said control field is coded to include a split bit which when coded in a first state specifies that said first and second groups of chips operate independently on signals applied to said mantissa and exponent digit positions as separate operands and said split bit when coded in a second state specifying that said first and second groups of chips operate on said signals applied to said mantissa and exponent digit positions as a single operand.

6. The unit of claim 5 wherein said first state corresponds to a binary ONE state and said second state corresponds to a binary ZERO, said split bit of each microinstruction word normally being coded in a binary ONE state in the absence of a requirement to operate said first and second groups of chips as a single unit.

7. The unit of claim 5 wherein said another control field includes at least a mantissa shift bit and wherein said circuit means includes conductor means and an inverter circuit for applying a signal corresponding to said mantissa shift bit and a signal corresponding to the complement of said mantissa shift bit respectively to said second and first multiplexer circuits, said mantissa shift bit when coded in a first state specifying a shifting of the contents of said mantissa and exponent digit positions from right to left through said first multiplexer circuit and said mantissa shift bit when coded in a second state specifying a shifting of the contents of said mantissa and exponent digit positions from left to right through said second multiplexer circuit.

8. The unit of claim 7 wherein said split bit and said mantissa shift bit each when in said first state conditioning said first multiplexer circuit to shift a binary ZERO signal into said least significant mantissa digit position and said split bit when in said first state and said shift bit in said second state conditioning said second multiplexer circuit to shift a binary ZERO signal into said most significant exponent digit position.

9. The processing unit of claim 1 wherein said unit further includes:
   a plurality of lookahead carry chip circuits, each being connected to a number of different ones of said groups of multibit microprocessor chips for generating output carry and propagation signals as required for lookahead operation; and,
   means for connecting a predetermined one of said plurality of lookahead carry chip circuits to said output register means, said means being conditioned to inhibit selectively said predetermined one of said lookahead carry chip circuits from propagating carry signals between said first and second groups of chips in accordance with said coding of said control field during said operative cycle.

10. The unit of claim 9 wherein said control field is coded to include a split control bit, each of said pair of operands including a mantissa portion and an exponent portion, each including a number of binary coded digits, a first one of said groups of chips being connected to store and operate on said digits of said mantissa portion and a second one of said groups being connected to store and operate on said digits of said exponent portion, and
   wherein each of said multibit microprocessor chips includes a carry in terminal for receivin a lookahead carry signal from one of said carry lookahead chips, each said lookahead carry chip including a plurality of carry propagate input terminals, a corresponding number of carry generate input terminals and a plurality of carry output terminals connected to different ones of said chips, said means for connecting including conductor means and gating means respectively for applying a signal representative of said split control bit to one of said plurality of carry propagate input terminals and to one of said carry generate input terminals respectively of said predetermined one of said chips, said split bit when coded in a first state inhibiting the application of a carry in signals to said carry in terminal of said least significant mantissa digit position generated by carries from said exponent digit positions.

11. The unit of claim 10 wherein each microinstruction word further includes a mantissa carry-in field and an exponent carry coded in field to include a mantissa carry-in bit and exponent carry-in bit respectively; and
   wherein said gating means includes an AND gate for combining signals corresponding to said split bit and said mantissa carry-in bit; and,
   each of said carry lookahead chips further including a carry-in terminal, said carry-in terminal of said predetermined one of said carry lookahead chips being connected to receive a signals corresponding to said exponent carry-in bit for generating carry output signals applied to said least significant mantissa digit position and most significant exponent digit position in accordance with the coding of said split control bit.

12. The processing unit of claim 1 wherein each of said multibit chips includes means for generating an output signal at an F=0 output terminal for indicating when the result generated by said chip equals ZERO and wherein said processing unit further includes:
   a leading zeros detector circuit comprising:
      a first priority encoder circuit having a number of input terminals, each input terminal connected to said F=0 output terminal of a different one of a number of said chips of said first group;
      a second priority encoder circuit connected in series with said first priority encoder circuit and having said number of input terminals, a group of said number of input terminals, each being connected to said F=0 output terminal of a different one of the remaining ones of said chips of said first group;
      gating means connected to said output register, to said F=0 output terminals of each of said chips of said second group and to the remaining ones of said number of input terminals of said second encoder circuit; and,
      first bistable means coupled to said second priority circuit for storing a ZERO indicator signal generated by said first and second priority circuits, said gating means being operative in response to each microinstruction word to selectively apply said F=0 output terminals of said second group of chips as inputs to said second priority circuit for enabling storage of said ZERO indicator signal representative of whether all of the chips of said first and second groups or only the chips of said first group have generated ZERO results.

13. The processing unit of claim 12 wherein said control field of each microinstruction word includes a split control bit and
   wherein said gating means includes a plurality of OR gates, each OR gate being connected to receive a signal corresponding to said split control bit and the F=0 output terminal of a different one of said chips of said second group, each said plurality of OR gates being conditioned by said split control bit when coded in a first state to apply a predetermined output signal to a corresponding one of said remaining ones of said second encoder circuit input terminals and each said plurality of OR gates being conditioned by said split control bit when coded in a second state to apply a signal from a corresponding one of said F=0 output terminals of said second group of chips.

14. The processing unit of claim 13 wherein said first state and said predetermined output signals each correspond to a binary ONE and wherein said second state corresponds to a binary ZERO.

15. The processing unit of claim 13 wherein said microprogrammed control section further includes test logic circuit means for generating an address and coupled to said addressing means and to said output register and
   wherein said unit further includes means for connecting said bistable means to said test logic means enabling testing of said ZERO indicator by one of said microinstruction words read out during a subsequent operative cycle.

16. The processing unit of claim 13 wherein each of said chips further includes:

a group of data input terminals operatively connected to said arithmetic and logic unit section associated therewith, and a group of data output terminals operatively connected to said associated arithmetic and logic unit section and wherein said leading zeros detector circuit further includes:

a plurality of bistable means coupled to said first and second priority circuits for storing shift count signals generated by said first and second priority encoder circuits indicative of the number of leading zeros, and wherein said unit further includes a multidigit shifter means coupled to said plurality of bistable means, said shifter means comprising:

a number of input terminals, each input terminal being connected to a different one of said group of data output terminals of said each chip;

a corresponding number of output terminals, each output terminal being connected to a different one of said group of data input terminals of said each chip; and a number of control input terminals coupled to receive said shift count signals, said shifter being conditioned by said shift count signals to shift the signals applied by said first and second groups of chips to said data output terminals by the number of ZERO digits present in all of said chips of said first and second groups or only said chips of said first group as specified by the coding of said control field.

17. Microprogrammable apparatus for performing an arithmetic operation upon a pair of operands, each operand including first and second portions, said apparatus comprising:

a cycled addressable control store including a plurality of storage locations for storing a corresponding number of microinstruction words, each including a number of control fields, one of said number of control fields including a split control bit coded to specify the physical organization of said apparatus during said performing of an arithmetic operation upon said pair of operands;

output register means coupled to said control store for storing a microinstruction word read out during a cycle of operation; and, addressing means coupled to said control store for applying an address for referencing one of said plurality of storage locations during said cycle of operation;

a first number of multibit microprocessor chips connected to operate in tandem for processing signals corresponding to said first portions of said operands;

a second number of multibit microprocessor chips connected to operate in tandem for processing signals corresponding to said second portions of said operands;

each chip of said first and second numbers of chips including:

an arithmetic and logic unit section;

a multibit addressable random access memory section connected to said arithmetic logic unit section, said memory section having a plurality of multibit storage locations; and, a multibit random access memory shift register and multiplexer section; and, multiplexer control circuit means coupled to a predetermined one of said chips included within said first and second numbers of chips, said control circuit means being coupled to said output register and operative in response to said split control bit of each microinstruction word read out from said control store during said each cycle of operation to selectively interconnect said first and second numbers of chips for operation upon said first and second operand portions as a single operand or as separate operands in accordance with said coding of said split control bit.

18. The apparatus of claim 17 wherein said control circuit means includes:

a first multiplexer circuit, said first multiplexer circuit having a number of data input terminals, at least one select input terminal, an enable input terminal and at least one output terminal;

a second multiplexer circuit, said second multiplexer circuit having a number of data input terminals, a first data input terminal being connected to said output terminal of said first multiplexer circuit, at least one select input terminal, an enable input terminal and at least one output terminal connected to a first data input terminal of said first multiplexer circuit;

conductor means connecting said first data input terminals of said first and second multiplexer circuits respectively to said predetermined one of said chips included within said first and second numbers of chips; and, means for coupling said select input terminals and said enable input terminals to said output register, said first and second multiplexer circuits being enabled selectively for operation in response to each microinstruction word read out from said control store during each operative cycle to interconnect selectively each said predetermined one of chips for transmitting signals between said data input terminals of said first and second multiplexer circuits as required for performing said arithmetic operation.

19. The apparatus of claim 18 wherein said first and second portions correspond to mantissa and exponent portions respectively, each including a number of binary coded digits, and wherein said output terminal of said first multiplexer circuit connects to said predetermined one of said first number of chips which corresponds to the least significant digit position of said mantissa portion and said output terminal of said second multiplexer connects to said predetermined one of said second number of chips which corresponds to the most significant digit position of said exponent portion;

said first and second multiplexer circuits being selectively conditioned to transmit said signals between said least significant mantissa digit position and said most significant exponent digit position providing increased precision in operating upon said pair of operands when said first and second numbers of chips are not connected to perform separate operations in parallel upon said mantissa and exponent portions.

20. The apparatus of claim 19 wherein second data input terminals of said first and second multiplexer circuits each is connected to apply a binary ZERO data signal for transfer to said output terminals of said first and second multiplexer circuits, and
   wherein said means for coupling includes:
      conductor means for applying a signal representative of the coding of said split control bit to said select input terminals; and,
      circuit means for applying shift control signals generated in response to another one of said plurality of control fields of said microinstruction word to said enable input terminals, said circuit means selectively enabling said first and second multiplexer circuits for shifting the contents of said mantissa and exponent digit positions in a direction specified by the coding of said another control field.

21. The apparatus of claim 20 wherein said split bit when coded in a first state specifies that said first and second number of chips operate independently on signals applied to said mantissa and exponent digit positions as separate operands and said split bit when coded in a second state specifying that said first and second numbers of chips operate on said signals applied to said mantissa and exponent digit positions as a single operand.

22. The apparatus of claim 21 wherein said first state corresponds to a binary ONE state and said second state corresponds to a binary ZERO, said split bit of each microinstruction word normally being coded in a binary ONE state in the absence of a requirement to operate said first and second number of chips as said single unit.

23. The apparatus of claim 21 wherein said another control field includes at least a mantissa shift bit, and
   wherein said circuit means includes conductor circuit means and an inverter circuit for applying a signal corresponding to said mantissa shift bit and a signal corresponding to the complement of said mantissa shift bit respectively to said second and first multiplexer circuits, said mantissa shift bit when coded in a first state specifying a shifting of the contents of said mantissa and exponent digit positions from right to left through said first multiplexer circuit and said mantissa shift bit when coded in a second state specifying a shifting of the contents of said mantissa and exponent digit positions from left to right through said second multiplexer circuit.

24. The apparatus of claim 23 wherein said split bit and said mantissa shift bit each when in said first state conditioning said first multiplexer circuit to shift a binary ZERO signal into said least significant mantissa digit position and said split bit when in said first state and said shift bit in said second state conditioning said second multiplexer circuit to shift a binary ZERO signal into said most significant exponent digit position.

25. The apparatus of claim 17 wherein said apparatus further includes:
   a plurality of lookahead carry chip circuits, each being connected to a number of different ones of said first and second numbers of multibit microprocessor chips for generating output carry and propagation signals as required for lookahead operation; and,
   means for connecting a predetermined one of said plurality of lookahead carry chip circuits to said output register means, said means being conditioned to inhibit selectively said predetermined one of said lookahead carry chip circuits from propagating carry signals between said first and second of chips in accordance with said numbers of coding of said split control bit during said cycle of operation.

26. The apparatus of claim 25 wherein said first and second portions correspond to a mantissa portion and an exponent portion respectively, each portion including a number of binary coded digits, and
   wherein each of said multibit microprocessor chips includes a carry-in terminal for receiving a lookahead carry signal from one of said carry lookahead chips, each said lookahead carry chip including a plurality of $\overline{\text{carry propagate}}$ input terminals, a corresponding number of $\overline{\text{carry generate}}$ input terminals and a plurality of carry output terminals connected to different ones of said chips, said means for connecting including conductor means and gating means respectively for applying a signal representative of said split control bit to one of said plurality of $\overline{\text{carry propagate}}$ input terminals and to one of said $\overline{\text{carry generate}}$ input terminals respectively of said predetermined one of said chips, said split bit when coded in a first state inhibiting the application of a carry-in signal to said carry-in terminal of said least significant mantissa digit position generated by carries from said exponent digit positions.

27. The apparatus of claim 26 wherein said plurality of control fields of each microinstruction word further includes a mantissa carry-in field and an exponent carry-in field coded to include a mantissa carry-in bit and exponent carry-in bit respectively; and
   wherein said gating means includes an AND gate for combining signals corresponding to said split bit and said mantissa carry-in bit; and
   each of said carry lookahead chips further including a carry-in terminal, said carry-in terminal of said predetermined one of said carry lookahead chips being connected to receive a signal corresponding to said exponent carry-in bit for generating carry output signals applied to said least significant mantissa digit position and most significant exponent digit position in accordance with the coding of said split control bit.

28. The apparatus of claim 17 wherein each of said multibit chips includes means for generating an output signal at an F=0 output terminal for indicating when the result generated by said chip equals ZERO and wherein said processing unit further includes:
   a leading zeros detector circuit comprising:
      a first priority encoder circuit having a number of input terminals, each input terminal connected to said F=0 output terminal of a different one of a number of said first number of chips;
      a second priority encoder circuit connected in series with said first priority encoder circuit and having said number of input terminals, a group of said number of input terminals, each being connected to said F=0 output terminal of a different one of the remaining ones of said first number of chips;
      gating means connected to said output register to said F=0 output terminals of each of said second number of chips and to the remaining ones of said number of input terminals of said second encoder circuit; and,
      first bistable means coupled to said second priority circuit for storing a ZERO indicator signal generated by said first and second priority circuits, said gating means being operative in response to each microinstruction word to selectively apply said F=0 output terminals of said second number of chips as inputs to said second priority circuit for enabling storage of said ZERO indicator signal representative of whether all of the chips of said first and second number or only the chips of said first number have generated ZERO results.

29. The apparatus of claim 28 wherein each of said chips further includes:
   a group of data input terminals operatively connected to said arithmetic and logic unit section associated therewith, and
   a group of data output terminals operatively connected to said associated arithmetic and logic unit section and wherein said leading zeros detector circuit further includes:
      a plurality of bistable means coupled to said first and second priority circuits for storing shift count signals generated by said first and second priority encoder circuits indicative of the number of leading zeros, and
   wherein said apparatus further includes a multidigit shifter means coupled to said plurality of bistable means, said shifter means comprising:
      a number of input terminals, each input terminal being connected to a different one of said group of data output terminals of said each chip;
      a corresponding number of output terminals, each output terminal being connected to a different one of said group of data input terminals of said each chip; and
      a number of control input terminals coupled to receive said shift count signals, said shifter being conditioned by said shift count signals to shift the signals applied by said first and second number of chips to said data output terminals by the number of ZERO digits present in all of said chips of said first and second number or only said chips of said first number as specified by the coding of said split control bit.

30. The apparatus of claim 17 wherein first and second ones of said number of control fields of a predetermined number of said microinstruction words are coded to specify like functions and said first and second ones of said number of control fields of other predetermined ones of said microinstruction words are coded to specify unlike functions for operating said first and second numbers of chips as a single unit and as two separate units.

31. A microprogram controlled apparatus for performing arithmetic operations upon a pair of floating point operands, each operand including a mantissa portion and an exponent portion having a plurality of hexidecimal coded digits, said apparatus comprising:
   a cycled addressable control store including a plurality of storage locations for storing a corresponding number of microinstruction words, each including a plurality of control fields one of which includes a split bit coded to indicate interconnection characteristics of said apparatus;
   output register means coupled to said control store for storing a microinstruction word read out during a cycle of operation of said control store; and,
   addressing means coupled to control store for applying an address for referencing one of said plurality of storage locations during said cycle of operation;
   first and second numbers of multibit microprocessor chips connected to operate in tandem for processing the digits of said mantissa portions and said exponent portions respectively, each chip having a number of terminals and including:
      an arithmetic logic unit section having first and second sets of input terminals for receiving first and second operands respectively corresponding to said mantissa and exponent portions;
      a multibit addressable random access memory section connected to said arithmetic logic unit section, each said memory section having a plurality of digit storage locations;
      a multibit random access memory shift and multiplexer section connected to said random access memory section and to first and second ones of said number of input terminals; and,
      conductor means connecting said first and second terminals on each of said chips to the second and first terminals respectively for a next succeeding and a preceding one of said chips for enabling the shifting of said mantissa and exponent digits by one bit position in a predetermined direction during said cycle of operation; and,
   control circuit means coupled to said first and second terminals of a predetermined one of said chips included within each of said numbers, said control circuit means being coupled to said output register and operative in response to each microinstruction word read out from said control store during each cycle to selectively interconnect said numbers of chips for operation as two independent sections and as a single section in accordance with coding of said split bit as required for performing said arithmetic operation upon said pair of operands.

32. The apparatus of claim 31 wherein said control circuit means includes:
   a first multiplexer circuit, said first multiplexer circuit having a number of data input terminals, at least one select input terminal, an enable input terminal and at least one output terminal;
   a second multiplexer circuit, said second multiplexer circuit having a number of data input terminals, a first data input terminal being connected to said output terminal of said first multiplexer circuit, at least one select input terminal, an enable input terminal and at least one output terminal connected to a first data input terminal of said first multiplexer circuit;
   conductor means connecting said first data input terminals of said first and second multiplexer circuits respectively to said first and second terminald of a predetermined one of said chips included within each of said numbers; and,
   means for coupling said select input terminals and said enable input terminals to said output register, said first and second multiplexer circuits being enabled selectively for operation in response to each microinstruction word read out from said control store during each cycle to interconnect selectively each said predetermined one of chips for transmitting signals between said data input terminals of said first and second multiplexer circuits and pairs of said first and second terminals of said predetermined ones of said chips as required for performing said arithmetic operation.

33. The apparatus of claim 32 wherein said output terminal of said first multiplexer circuit connects to said predetermined one of said first number of chips which corresponds to the least significant digit position of said mantissa portion and said output terminal of said second multiplexer connects to said predetermined one of said second number of chips which corresponds to the most significant digit position of said exponent portion; and said first and second multiplexer circuits being selectively conditioned to transmit said signals between said least significant mantissa digit position and said most significant exponent digit position and said first and second terminals providing increased precision in operating upon said pair of operands when said first and second number of chips are not connected to perform separate operations in parallel upon said mantissa and exponent portions.

34. The apparatus of claim 33 wherein second data input terminals of said first and second multiplexer circuits each is connected to apply a binary ZERO data signal for transfer to said output terminals of said first and second multiplexer circuits, and wherein said means for coupling includes:
conductor means for applying a signal representative of the coding of said control field to said select input terminals; and,
circuit means for applying shift control signals generated in response to another one of said number of control fields of said microinstruction word to said enable input terminals, said circuit means selectively enabling said first and second multiplexer circuits for shifting the contents of said mantissa and exponent digit positions in a direction specified by the coding of said another one of said control fields.

35. The apparatus of claim 34 wherein said operands further include sign portions, said split bit when coded in a first state specifies that said first and second numbers of chips operate independently on signals applied to said mantissa and exponent digit positions as separate operands and said split bit when coded in a second state specifying that said first and second number of chips operate on said signals applied to said mantissa and exponent digit positions as a single operand and wherein said first number of chips includes a chip for operating upon said sign portions of said operands in accordance wtih the coding of predetermined ones of said number of control fields.

36. The apparatus of claim 35 wherein said first state corresponds to a binary ONE state and said second state corresponds to a binary ZERO, said split bit of each microinstruction word normally being coded in a binary ONE state in the absence of a requirement to operate said first and second numbers of chips as a single unit.

37. The apparatus of claim 35 wherein said another one of said control fields includes at least a mantissa shift bit, and wherein said circuit means includes conductor circuit means and an inverter circuit for applying a signal corresponding to said mantissa shift bit and a signal corresponding to the complement of said mantissa shift bit respectively to said second and first multiplexer circuits, said mantissa shift bit when coded in a first state specifying a shifting of the contents of said mantissa and exponent digit positions from right to left through said first multiplexer circuit and said mantissa shift bit when coded in a second state specifying a shifting of the contents of said mantissa and exponent digit positions from left to right through said second multiplexer circuit.

38. The apparatus of claim 31 wherein said apparatus further includes:
a plurality of lookahead carry chip circuits, each being connected to a number of different ones of said numbers of multibit microprocessor chips for generating output carry and propagation signals as required for lookahead operation; and,
means for connecting a predetermined one of said plurality of lookahead carry chip circuits to said output register means, said means being conditioned to inhibit selectively said predetermined one of said lookahead carry chip circuits from propagating carry signals between said first and second numbers of chips in accordance with said coding of said control field during said cycle of operation.

39. The apparatus of claim 31 wherein each of said multibit chips includes means for generating an $F=0$ output signal at one of said terminals for indicating when the result generated by said chip equals ZERO and wherein said processing unit further includes:
a leading zeros detector circuit comprising:
a first priority encoder circuit having a number of input terminals, each input terminal connected to said $F=0$ output terminal of a different one of a number of said chips of said first number;
a second priority encoder circuit connected in series with said first priority encoder circuit and having said number of input terminals, a group of said number of input terminals, each being connected to said $F=0$ output terminal of a different one of the remaining ones of said chips of said first number;
gating means connected to said output register, to said $F=0$ output terminals of each of said chips of said second number and to the remaining ones of said number of input terminals of said second encoder circuit; and,
first bistable means coupled to said second priority circuit for storing a ZERO indicator signal generated by said first and second priority circuits, said gating means being operative in response to each microinstruction word to selectively apply said $F=0$ output terminals of said second number of chips as inputs to said second priority circuit for enabling storage of said ZERO indicator signal representative of whether all of said first and second numbers of chips or only said first number of chips has generated ZERO results.

40. The apparatus of claim 31 wherein first and second ones of said plurality of control fields of a predetermined number of said microinstruction words are coded to specify like functions and said first and second ones of said number of control fields of other predetermined ones of said microinstruction words are coded to specify unlike functions for operating said first and second numbers of chips as a single unit and as two separate units.

* * * * *